United States Patent
Okumura et al.

(10) Patent No.: US 6,321,721 B1
(45) Date of Patent: Nov. 27, 2001

(54) APPARATUS FOR DETECTING THE FUEL PROPERTY FOR AN INTERNAL COMBUSTION ENGINE

(75) Inventors: Hiroshi Okumura, Kariya; Katsuhiko Kawai, Nagoya, both of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/494,245

(22) Filed: Jan. 31, 2000

(30) Foreign Application Priority Data

| Jan. 29, 1999 | (JP) | ................................................ | 11-020988 |
| Oct. 8, 1999 | (JP) | ................................................ | 11-287476 |
| Dec. 16, 1999 | (JP) | ................................................ | 11-356807 |

(51) Int. Cl.$^7$ .................... F02D 41/36; G01N 33/22
(52) U.S. Cl. .................. 123/491; 73/117.3; 73/35.02
(58) Field of Search .................... 123/491, 436; 73/117.3, 35.02

(56) References Cited

U.S. PATENT DOCUMENTS

| 5,515,280 | * | 5/1996 | Suzuki | ................................. | 123/491 |
| 5,586,537 | * | 12/1996 | Tomisawa et al. | ................... | 123/435 |
| 5,732,681 | | 3/1998 | Ogita | .................................... | 123/492 |
| 5,817,923 | | 10/1998 | Ohsaki et al. | ....................... | 73/35.02 |
| 6,176,222 | * | 1/2001 | Kirwan et al. | ....................... | 123/492 |

FOREIGN PATENT DOCUMENTS 10-252550   9/1998  (JP).

* cited by examiner

Primary Examiner—Erick Solis
(74) Attorney, Agent, or Firm—Nixon & Vanderhye P.C.

(57) ABSTRACT

The following conditions are used as requirements for executing a fuel property detection: an intake air temperature is lower than a restart judging value; a water temperature is in a predetermined range; and it is in an idle operation. In a case that the requirements are established, an injection amount of fuel and a combustion amount of fuel are calculated. After that, the injection amount is corrected by using a learned value for correcting an error of system, and the combustion amount is corrected according an intake pressure. A fuel property parameter for evaluating the fuel property is calculated based on a ratio of an accumulated value of the combustion amount relative to an accumulated value of the injection amount during a predetermined time. A command value of the injection amount for a fuel injection valve is corrected according to the fuel property parameter calculated above. As a result, the fuel property is reflected in the command value of the injection amount.

5 Claims, 19 Drawing Sheets

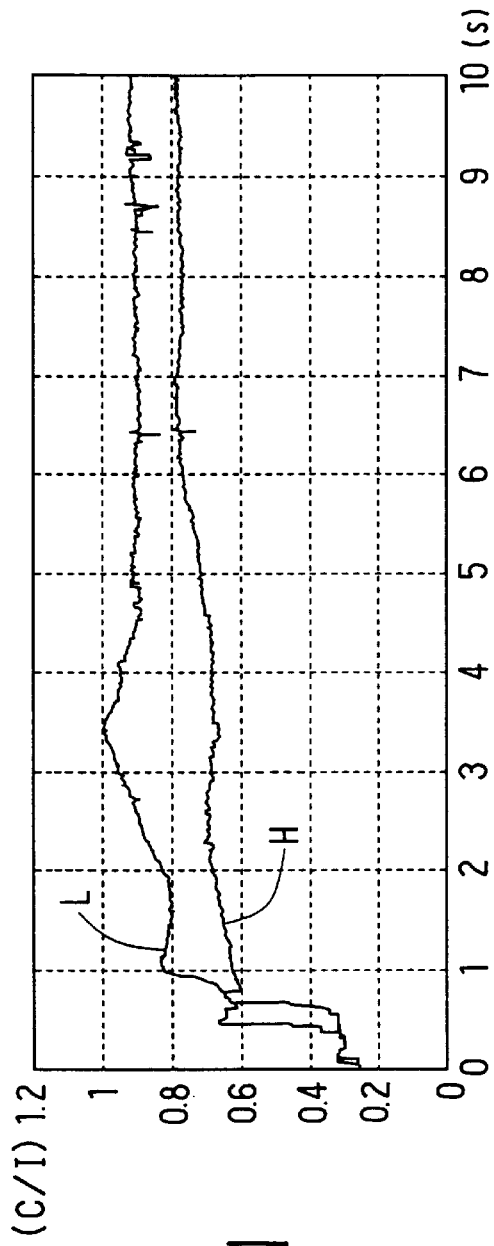
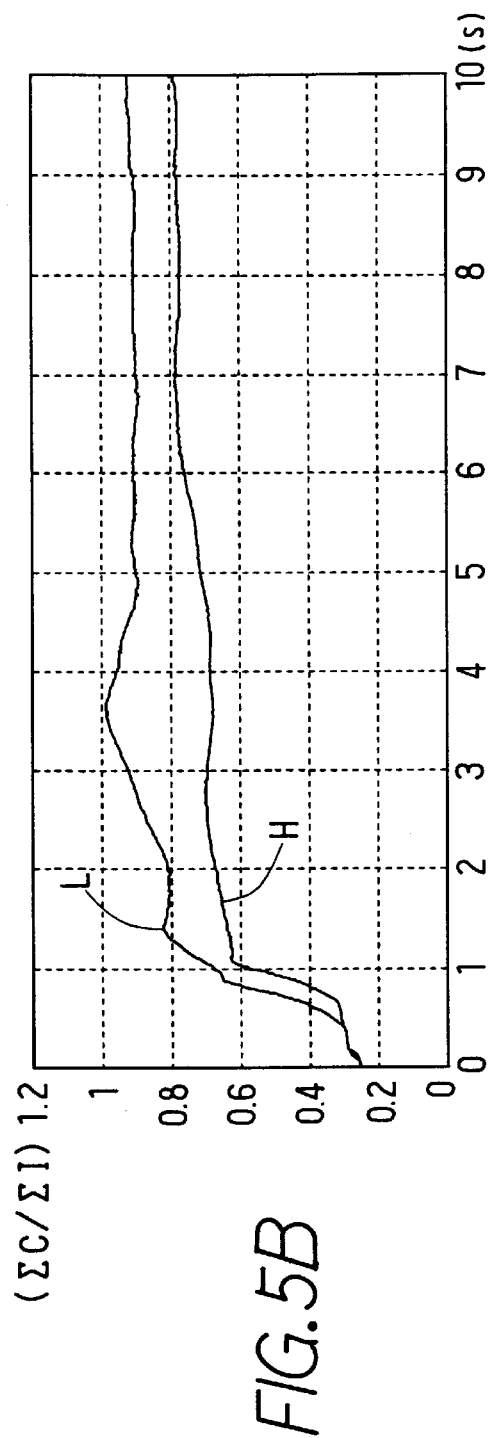
FIG.5A
FIG.5B

FIG. 14A

|  |  | NEm (rpm) | | |
|---|---|---|---|---|
|  |  | 1000 | 2000 | 3000 |
| PMm (hPa) | 300 | 0.7990 | 0.7982 | 0.7703 |
|  | 500 | 0.5145 | 0.6609 | 0.6885 |
|  | 990 | 0.3011 | 0.4625 | 0.4546 |

FIG. 14B

| NEm (rpm) | 1000 | 2000 | 3000 | 4000 | 5000 | 6000 |
|---|---|---|---|---|---|---|
| L | 3 | 2 | 2 | 1 | 1 | 1 |

FIG. 15

| Tws 30°C | Tw (°C) | | | | | | | | | |
|---|---|---|---|---|---|---|---|---|---|---|
|  | -20 | -10 | 0 | 10 | 20 | 30 | 40 | 50 | 60 | 70 |

| Tws 10°C | Tw (°C) | | | | | | | | | |
|---|---|---|---|---|---|---|---|---|---|---|
|  | -20 | -10 | 0 | 10 | 20 | 30 | 40 | 50 | 60 | 70 |

| Tws -10°C | | Tw (°C) | | | | | | | | | |
|---|---|---|---|---|---|---|---|---|---|---|---|
|  |  | -20 | -10 | 0 | 10 | 20 | 30 | 40 | 50 | 60 | 70 |
| $a_1$ | 0.74 |  | 1 | 1 | 1 | 1 | 1 | 1 | 1 | 2 | 2 |
|  | 0.86 |  | 1 | 1 | 1 | 2 | 2 | 2 | 2 | 2 | 3 |
|  | 0.90 |  | 2 | 2 | 2 | 2 | 2 | 3 | 3 | 3 | 3 |
|  | 0.93 |  | 2 | 2 | 2 | 3 | 3 | 3 | 3 | 3 | 4 |
|  | 0.94 |  | 2 | 3 | 3 | 3 | 3 | 3 | 4 | 4 | 4 |
|  | 0.95 |  | 3 | 3 | 4 | 4 | 4 | 4 | 4 | 4 | 5 |
|  | 0.96 |  | 4 | 4 | 4 | 4 | 4 | 5 | 5 | 5 | 5 |

FIG. 16
| Flevel | 1 | 2 | 3 | 4 | 5 |
|---|---|---|---|---|---|
| Fpart | 0.0 | 0.6 | 1.2 | 1.8 | 2.4 |
FIG. 17
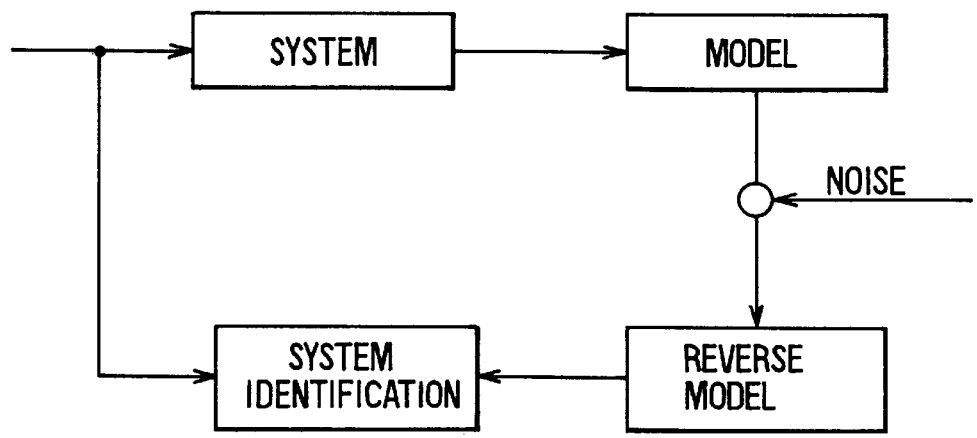
FIG. 18
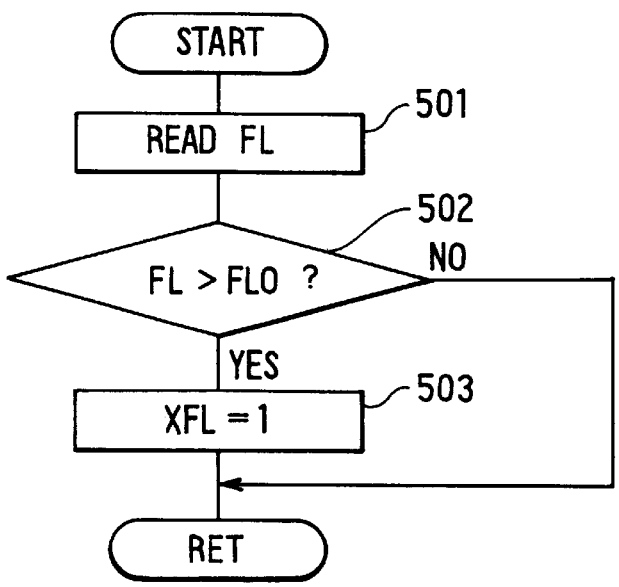

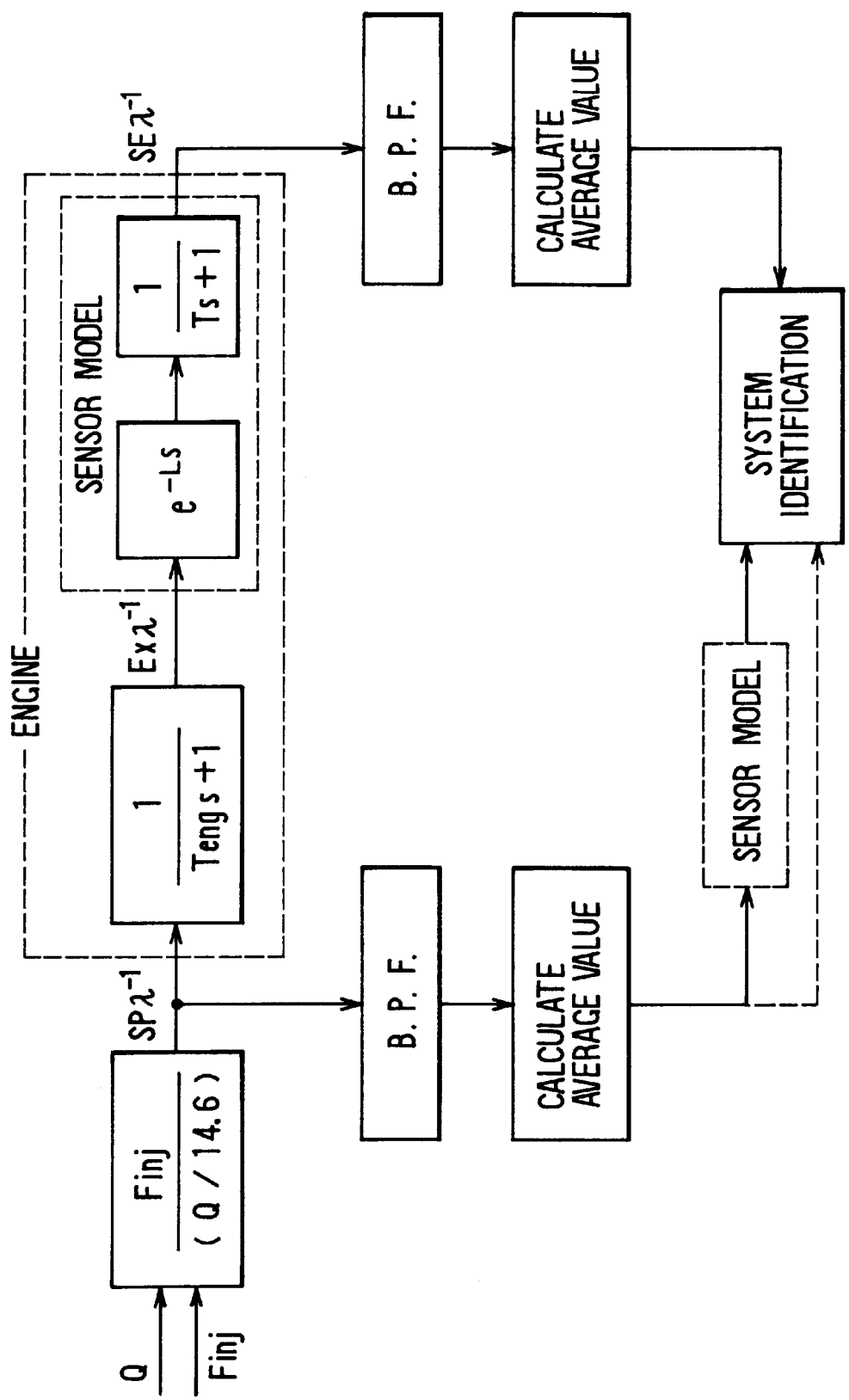

APPARATUS FOR DETECTING THE FUEL PROPERTY FOR AN INTERNAL COMBUSTION ENGINE

CROSS-REFERENCE TO RELATED APPLICATION

This application is based on Japanese Patent Application No. 11-20988 filed on Jan. 29, 1999, No. 11-287476 filed on Oct. 8, 1999, and No. 11-356807 filed on Dec. 16,1999, the contents of which are incorporated herein by reference.

BACKGROUND OF THE INVENTION

1. Field of the Invention

The present invention relates to a fuel property detecting apparatus for detecting a property of fuel supplied to an internal combustion engine.

2. Description of Related Art

A usual gasoline engine mounted on vehicle are mostly arranged that an intake pipe is equipped with a fuel injection valve. Fuel (gasoline) is injected into an intake port. In this intake port injection system, a part of fuel injected from the fuel injection valve is directly introduced into cylinders. The rest of fuel adheres on an inner surface of the intake port and a surface of an intake valve, and it gradually evaporates and is introduced into the cylinders. Accordingly, the amount of fuel introduced into the cylinders varies according to an amount of evaporating fuel which adheres on the inner surface of the intake port or the like (wet). The amount of evaporating fuel (rate of an evaporation) varies according to the property of fuel, but the property of fuel is not stabilized even among the same kind of fuel. The property is different between makers, and is changed according to the season and sales area even in the same makers fuels. Accordingly, it is necessary to detect the fuel property in order to provide an accurate air-fuel ratio control (fuel injection control) by considering the amount of evaporating fuel.

It is proposed that the fuel property is detected on the basis of each of parameters such as an ability to start, a variation of the rotation and a rising of the rotation as described in JP-A-9-203342.

However, the ability to start, the variation of the rotation and the rising of the rotation are varied according to various factors except for the fuel property. Therefore, it is impossible to detect the fuel property accurately, even if the fuel property is detected by using these parameters, since it is influenced by the various factors except for the fuel property. For instance, in a manual-mission car, there are possibilities of an erroneous detection, because the variation of the rotation and the rising of the rotation varies a lot according to a shift-operation by driver.

As a result, a driveability, a fuel consumption and an emission might become worse, since an accuracy of a correction by the fuel property is lowered.

SUMMARY OF THE INVENTION

The present invention was accomplished in consideration of the above-mentioned circumstances, and, the object is to provide a fuel property detecting apparatus for an internal combustion engine that the apparatus is able to detect the fuel property accurately.

In order to achieve the above-mentioned object, the present invention apply to the fuel property detecting apparatus for an internal combustion engine. The injection amount of fuel which is injected from a fuel injection valve or a parameter having a correlation with the injection amount (hereafter generally referred as an injection amount parameter) is calculated by an injection amount parameter calculating means. The combustion amount of fuel which is burnt in the cylinder or a parameter having a correlation with the combustion amount (hereinafter generally referred as a combustion amount parameter) is calculated by means for calculating a combustion amount parameter. Then, the fuel property is detected based on a relationship between the injection amount parameter and the combustion amount parameter.

For instance, a volatility of fuel (ability of evaporation) decreases as the fuel property becomes heavier. The amount of fuel adhered on the inner wall of the intake port or the like (wet amount) is increased and a ratio of the combustion amount to the injection amount of fuel is decreased. Therefore, the relationship between the injection amount and the combustion amount of fuel varies according to the fuel property. Accordingly, it is possible to detect the fuel property accurately, when the fuel property is detected based on the relationship between the injection amount parameter and the combustion amount parameter.

Here, in a case that the combustion amount of fuel is used as the combustion amount parameter, an intake air amount of the internal combustion engine can be detected by an intake air amount detecting means. Air-fuel ratio in exhaust gas can be detected by an air-fuel ratio detecting means. The combustion amount can be calculated by using the detected values. That is, the combustion amount of fuel can be calculated, when the intake air amount and air-fuel ratio in exhaust gas are used, because air-fuel ratio in exhaust gas is defined by the intake air amount and the combustion amount of fuel. Further, it is not necessary to dispose new sensor for detecting the combustion amount parameter, because a usually disposed sensors for air-fuel ratio control can be used for detecting the intake air amount and air-fuel ratio in exhaust gas. Therefore, the costs can be cut down.

A fuel supply excess rate, which is a reciprocal of an air excess rate of a mixture supplied for the internal combustion engine, can be calculated as the injection amount parameter. A combustion fuel excess rate, which is the reciprocal of an air excess rate of exhaust gas, can be calculated as the combustion amount parameter. For instance, a ratio of the combustion fuel excess rate to the fuel supply excess rate is decreased by increasing the wet amount as the fuel property becomes heavier. Therefore, the relationship between the fuel supply excess rate and the combustion fuel excess rate fuel varies according to the fuel property. Accordingly, it is possible to detect the fuel property accurately, when the fuel property is detected based on the relationship between the fuel supply excess rate and the combustion fuel excess rate fuel. In a case that the invention is applied to the system which calculates the combustion fuel excess rate based on an output signal of an air-fuel ratio sensor and controls air-fuel ratio. The invention can simplify a calculating process for the fuel property detection, because the process for calculating the combustion amount parameter is extremely simplified.

Further, the fuel property is detected by comparing an accumulated value of the combustion amount parameter and an accumulated value of the injection amount parameter during a predetermined time. As a result, it is possible to improve a detecting accuracy of the fuel property, because it is possible to reduce an influence of noise and a variation of an operating condition.

Further, the fuel property is detected by comparing an accumulated value of a difference between the injection amount parameter and the combustion amount parameter and the accumulated value of the injection amount parameter during a predetermined time. That is, the difference between the injection amount and the combustion amount is used as a parameter for evaluating the wet amount adhering on the inner wall of the intake port or the like. The ratio of the wet amount to the injection amount increases as the fuel property becomes heavier. Accordingly, it is possible to detect the fuel property accurately, by comparing the accumulated value of the difference between the injection amount parameter and the combustion amount parameter and the accumulated value of the injection parameter during the predetermined time.

Further, it is considered that the wet amount varies in accordance with the operating condition of the internal combustion engine. At least one of the injection amount parameter and the combustion amount parameter or a relationship therebetween or a fuel property detecting criterion are corrected according to the operating condition of the internal combustion engine. As a result, it is possible to carry out the stable detection of the fuel property which is not dependent on the operating condition of the internal combustion engine.

In this case, the wet amount varies according to an intake pressure, an intake air amount, an engine rotational speed, a water temperature or the like, but, is most strongly influenced by the intake pressure. The attention is directed to this point. At least one of the injection amount parameter and the combustion amount parameter or a relationship therebetween or the fuel property detecting criterion is corrected according to the intake pressure. As a result, it is possible to carry out the stable detection of the fuel property which is not dependent on the operating condition of the internal combustion engine by using the intake pressure.

Further, the wet amount is strongly influenced relatively by the engine rotational speed. Therefore, at least one of the injection amount parameter and the combustion amount parameter or the relationship therebetween or the fuel property detecting criterion is corrected according to the engine rotational speed. As a result, it is possible to carry out the stable detection of the fuel property which is not dependent on the operating condition of the internal combustion engine by using the engine rotational speed.

Further, the wet amount decreases as the temperature of the internal combustion engine becomes higher. Therefore, the detecting accuracy of the fuel property is lowered. The variation of the combustion amount according to a difference of the fuel properties is decreased as the temperature becomes higher. In the present invention, it can be used that it is detected whether the internal combustion engine is restarted under a hot condition (hereafter referred as the hot-restart) or not by a hot-restart judging means. The fuel property detection by the fuel property detecting means is prohibited by the fuel property detection prohibiting means upon the hot-restart. That is, the temperature of the inner wall of the intake port or the like has maintained high for a starting of the engine. Then, the wet amount is little in the hot-restart. Therefore, the variation of the combustion amount based on the difference of the fuel properties is little and the detecting accuracy lowers. Accordingly, it is possible to prevent a lowering of the detecting accuracy of the fuel property by prohibiting the detection of the fuel property at the hot-restart.

In both of the heavy fuel and the light fuel, an adhering amount of the injected fuel on the inner surface of the intake port or the like (generating amount of wet) and an evaporating amount of wet are balanced when the temperature of the internal combustion engine rises to a certain level after the starting. The injection amount and the combustion amount of fuel become substantially equal. Accordingly, if there is a difference between the injection amount and the combustion amount of fuel when it rises to such the temperature, the difference can be taken as an error in the system.

This point is taken into consideration. The temperature of the internal combustion engine is detected by an engine temperature detecting means. The relationship between the injection amount parameter and the combustion amount parameter is learned by a learning means when the temperature of the internal combustion engine is not less than a predetermined temperature. At least one of the injection amount parameter and the combustion amount parameter or the relationship therebetween or the fuel property detecting criterion, which are used for detecting the fuel property, is corrected by a learning correcting means by using a learned value which is learned in the learning means. That is, it is possible to learn the system error if the relationship between the injection amount parameter and the combustion amount parameter is learned when the temperature of the internal combustion engine is not less than the predetermined temperature where the injection amount and the combustion amount become substantially equal. It is possible to cancel the system error from the detection of the fuel property by using the learned value. Therefore, it is possible to improve the detecting accuracy of the fuel property.

Further, if a predetermined time has elapsed from the starting, the temperature of the internal combustion engine reaches not less than the predetermined temperature in which the injection amount and the combustion amount of fuel become equal. Therefore, the relationship between the injection amount parameter and the combustion amount parameter is learned by a learning means after an elapse of a predetermined time from the starting of the internal combustion engine. At least one of the injection amount parameter and the combustion amount parameter or the relationship therebetween or the fuel property detecting criterion is corrected by using a learned value. The learned value is learned in the learning means. In such a construction, it is possible to improve the detecting accuracy by canceling the error in the system, similar to the above-mentioned construction.

In order to achieve the above-mentioned object, in the present invention, the attention is directed to a point that the evaporating time constant (evaporating speed) of fuel evaporation are different according to the difference of the fuel properties. The fuel property is detected after the evaporating time constant of fuel is calculated. Specifically, the evaporating time constant of fuel in a fuel transport system model or a physical amount depending on it (hereafter referred as a fuel property parameter) is calculated by the system identification theory by using the fuel transport system model. The model models behaviors of fuel (e.g., a wall surface adherence, an evaporation or the like) in the fuel transport system model until the injected fuel from the fuel injection valve is introduced into the cylinder of the internal combustion engine. The system identification theory is a theory to calculate parameters of transfer functions of a control object by using input and output information of the control object. In the present invention, the control object is the fuel transport system model, the input information is the injection amount of fuel injected from the fuel injection valve, and the output information is the fuel amount actually introduced into the cylinder (hereafter referred as an introduced fuel amount).

In this case, the injection amount as the input information of the fuel transport system model is a known value, because it is calculated in an injection amount calculating means (engine control computer), but introduced fuel amount as the output information can not be detected directly. In the present invention, the attention is directed to that air-fuel ratio of exhaust gas varies as the variation of the introduced fuel amount. Air-fuel ratio of exhaust gas is detected by the air-fuel ratio sensor. The introduced fuel amount is predicted based on air-fuel ratio of exhaust gas.

However, there are delays until the output variation of the fuel transport system model (variation of the introduced fuel amount) appears on the output of the air-fuel ratio sensor. The first is a delay (flow delay) until the gas in the cylinder of the internal combustion engine flows to the air-fuel ratio sensor through the exhaust pipe after an elapse of each stroke such as introduction, compression, expansion and exhaust. The second is a delay (detection delay) based on a response characteristic of the air-fuel ratio sensor. Accordingly, in a case that the output information of the fuel transport system model is predicted based on the output of the air-fuel ratio sensor, it is necessary to synchronize the phases of the input and output information.

In the present invention, the delay until the output variation appears on the output variation of the air-fuel ratio sensor is taken into consideration. The fuel property parameter of the fuel transport system model is calculated based on the injection amount and the output of the air-fuel ratio sensor by a parameter calculating means. The fuel property is detected based on the calculated fuel property parameter by a fuel property detecting means. In such a construction, it is possible to detect the fuel property accurately by using the fuel transport system model. Additionally, number of parts is not increased, because the air-fuel ratio sensor traditionally disposed in the exhaust pipe for the air-fuel ratio feedback control may be used as the air-fuel ratio sensor for predicting the output information of the fuel transport system model. Therefore, it is possible to establish a requirement to reduce the cost.

Further, in a case that the phase of the output information of the fuel transport system model predicted from the output of the air-fuel ratio sensor is synchronized with the phase of the input information, there are two ways. The first is a method for synchronizing the phases of the input and output information by advancing the phase of the predicted output information. The second is a method for synchronizing the phases of the input and output information by delaying the phase of the input information. However, as the former one, the method advancing the phase of the output information predicted based on the output of the air-fuel ratio sensor has a characteristic to amplify a sensor noise. Accordingly, it has a tendency to be influenced by the sensor noise and a disadvantage to need a future value.

In the present invention, it is preferable to synchronize the phase of the input and output information of the fuel transport system model by applying a delay correction to the injection amount. A sensor model can be used. The sensor model models a delay until the output variation of the fuel transport system model appears on the output variation of the air-fuel ratio sensor. In the method to delay the phase of the input information, the sensor noise is not amplified, and the influence of the sensor noise is little. Additionally, the calculating accuracy can be improved, because it is not necessary to use the future value, and it is possible to process by using only the known data.

On the other hand, a combustion fuel amount may be used as a substitute information of the introduced fuel amount, because the introduced fuel amount taken as the output of the fuel transport system model is substantially the same as the amount of fuel burnt in the cylinder (combustion fuel amount). It is possible to calculate the combustion fuel amount based on the amount of introduced air into the cylinder of the internal combustion engine and the output of the air-fuel ratio sensor (air-fuel ratio in exhaust gas). However, the phase of the output of the air-fuel ratio sensor has a delay (flow delay, detection delay) relative to the phase of a detected value of the introduced air amount. This delay is substantially the same as a delay which is modeled by the above-mentioned sensor model.

In the present invention, the injection amount and the introduced air amount are applied the delay correction by using the sensor model. The combustion fuel amount is calculated based on the air-fuel ratio detected by the air-fuel ratio sensor and the delay corrected introduced air amount. The fuel property parameter is calculated by using the delay corrected injection amount and the combustion fuel amount. The introduced air amount is processed by the delay correction by using the sensor model. The phase of the air-fuel ratio detected by the air-fuel ratio sensor and the phase of the delay corrected introduced air amount are synchronized. Therefore, it is possible to calculate the combustion fuel amount accurately.

In this case, it is preferable that the sensor model models the flow delay from the fuel transport system to the air-fuel ratio sensor and the detection delay of the air-fuel ratio sensor. In such a construction, it is possible to construct a sensor model which takes into consideration all factors of delay until the output variation of the fuel transport system model appears on the output variation of the air-fuel ratio sensor. Therefore, it is possible to improve the calculating accuracy of the sensor model.

Further, the flow delay and the detection delay which are modeled by sensor model are set according to the operating condition of the internal combustion engine. That is, The gas flow speed from the fuel transport system to the air-fuel ratio sensor and the time constant of the air-fuel ratio sensor vary according to the operating condition of the internal combustion engine (for instance, engine rotational speed, intake pressure or the like). Therefore, the flow delay and the detection delay which are modeled by sensor model are set according to the operating condition of the internal combustion engine. It is possible to set the proper flow delay and the proper detection delay according to the operating condition of the internal combustion engine.

The input and output of the fuel transport system model (the injected amount and the introduced fuel amount) are maintained constant and not varied when the operating condition of the internal combustion engine is in the steady operating condition. The difference of the evaporating time constant of fuel does not appear on the introduced fuel amount (the output of the fuel transport system model).

In the present invention, it is preferable to detect the fuel property by calculating the fuel property parameter when a transient operating condition is detected by a transient detecting means. The injected fuel amount varies at the transient operating condition and the introduced fuel amount varies far behind it. The difference in the evaporating time constant of fuel which adhered on the inner wall of the fuel transport system appears as a difference of the time constant of the delays on the introduced fuel amount variation. Therefore, It is possible to calculate the fuel property parameter in the fuel transport system model accurately.

Further, the evaporating speed of the adhering fuel on the inner wall of the fuel transport system increases as the temperature becomes higher. The adhering amount of fuel on the inner wall of the fuel transport system is decreased. Therefore, the calculating accuracy of the fuel property parameter is decreased, because the variation of the introduced fuel amount based on the difference of the fuel property (output variation of the fuel transport system model) is decreased as the temperature becomes higher.

In the present invention, it is preferable to determine whether the internal combustion engine is restarted under the hot condition (hereafter referred as the hot-restart) or not. The detection of the fuel property by the fuel property detecting means is prohibited by a property detection prohibiting means when it is in the hot-restart. That is, the variation of the introduced fuel amount according to the difference of the fuel property is little. The temperature of the inner wall of the fuel transport system has been high from just after the starting. The adhering amount of fuel on the inner wall is little when it is in the hot-restart. Therefore, the calculating accuracy of the fuel property parameter is decreased and the detecting accuracy of the fuel property is decreased. Accordingly, it is possible to prevent the deterioration of the detecting accuracy of the fuel property, if the detection of the fuel property is prohibited when it is in the hot-restart.

Further, in a case that the engine is restarted under a cold condition (cold-restart), the temperature on the inner wall of the fuel transport system becomes high as operating time passes away. Therefore, the calculating accuracy of the fuel property parameter is decreased, because the adhering amount of fuel on the inner wall of the fuel transport system is decreased after warm-up is progressed enough.

It is preferable to detect the temperature of the internal combustion engine by a engine temperature detecting means, and to prohibit the detection of the fuel property when the temperature of the internal combustion engine is not less than the predetermined temperature. The detection of the fuel property can be executed at a period. The period is that the adhering amount of fuel on the inner wall of the fuel transport system is relatively a lot after cold-restart, that is, the variation of the introduced fuel amount based on the difference of the fuel property becomes relatively large. Therefore, it is possible to improve the detecting accuracy of the fuel property.

Further, an accumulation of the adhering fuel on the wall surface of the fuel transport system is not enough just after the restart. Therefore, more than a usual amount of fuel is injected to maintain a predetermined air-fuel ratio of exhaust gas. In this time, the input and output appears such that the input is more than a usual amount, and the output is the same as a usual amount. There is a possibility to make an erroneous detection, because this condition is the same as using of fuel having a large evaporating time constant, even under using fuel having a small evaporating time constant.

In the present invention, the detection of the fuel property is prohibited, until the accumulation of fuel adhered on the wall is completed. A start enrichment bears the accumulation of the wall-adhering fuel. Therefore, it can be used that the detection of the fuel property is prohibited until a correction amount of the start enrichment becomes not more than a predetermined value. In such a construction, it is possible to prevent the erroneous detection of the fuel property just after the starting of engine. Further, it is possible to achieve the same effect even to prohibit the detection of the fuel property until the elapsed time from the starting reaches a predetermined value instead of the correction amount of the start enrichment.

Further, fuel is not injected from the fuel injection valve during fuel-cut. In contrast, the air-fuel ratio sensor continues to detect air-fuel ratio during fuel-cut. Therefore, it is possible to detect the fuel property. However, definite erroneous detection of the fuel property is carried out, if the detection of the fuel property is carried out under fuel-cut.

Accordingly, it is preferable to prohibit the detection of the fuel property during fuel-cut and a predetermined time period from an end of fuel-cut. Here, in the predetermined time period from an end of fuel-cut, the detection of the fuel property is also prohibited in the same way as in fuel-cut. The reason of this construction is that the deviation of fuel in the fuel transport system and air-fuel ratio of exhaust gas is not stable just after the end of fuel-cut. The detection of the fuel property is prohibited during the predetermined time period until these become stable. Therefore, it is possible to prevent an erroneous detection of the fuel property during fuel-cut and just after it.

Further, the difference between the evaporating time constant of fuel hardly appears on the introduced fuel amount during an idle operation.

Accordingly, it is preferable to prohibit the detection of the fuel property during the idle operation and a predetermined time period after an end of the idle operation. Here, the detection of the fuel property during the predetermined time period from an end of the idle operation is also prohibited in the same way as in the idle operation. The reason of this construction is that the deviation of fuel in the fuel transport system and air-fuel ratio of exhaust gas is not stable just after the end of the idle operation. The detection of the fuel property is prohibited during the predetermined time period until these become stable. Therefore, it is possible to prevent an erroneous detection of the fuel property during the idle operation and just after it.

Generally, changing the property of fuel mostly happens when the fuel tank is refueled with fuel having different fuel property. Therefore, it is preferable to carry the detection of the fuel property out after refueling.

A refuel detecting means detects whether the fuel tank is refueled or not. A transient operating means forcedly generates a temporary transient operating condition for detecting the fuel property. In this construction, it is possible to execute the detection of the fuel property at every refuels.

As described above, it is preferable to prohibit the fuel property detection during the idle operation. However, in a case that it is left in the idle operation after the starting, warm-up is progressed to increase a temperature in the fuel transport system. Therefore, after that, there is a possibility to be not able to detect the fuel property accurately, even the fuel property detection is executed.

In the present invention, the fuel property is detected by generating the transient operating condition forcedly and briefly by the transient operating means when the idle operation of the internal combustion engine is detected by the idle detecting means. Therefore, it is possible to detect the fuel property accurately during the idle operation even in the case that it is left in the idle operation after the starting.

Here, the injection amount is forcedly varied little to generate the transient operation condition forcedly. Therefore, it is possible to generate the transient operation condition, and to suppress an influence on the driveability.

Further, the injection amount is corrected according to the detection result of the fuel property by an injection amount correcting means. As a result, the injection amount can be a proper amount according to the property of fuel used. Therefore, it is possible to decrease an emission, fuel consumption and a stable driveability which are not dependent on the fuel property.

In the present invention, as shown in FIG. 10, the input information of the fuel transport system model is taken as the injection amount. However, it is possible to constitute a model in which the input information is taken as the supply air-fuel ratio, since the supply air-fuel ratio of the internal combustion engine varies according to a fluctuation of the injection amount.

In this case, a fuel and air transport system model is used. The model models a behavior of the mixture, including fuel injected from the fuel injection valve and introduced air, until the mixture is introduced into the cylinder of the internal combustion engine. The input information of the fuel and air transport system model is taken as the supply air-fuel ratio. The output information is taken as the air-fuel ratio of exhaust gas. Then, the evaporating time constant of fuel or a physical amount dependent thereon is calculated (hereafter referred to a fuel property parameter) based on the supply air-fuel ratio and the output of the air-fuel ratio sensor. In the calculation, it is taken into the consideration that the delay until the air-fuel ratio sensor detects the air-fuel ratio of exhaust gas. As a result, it is possible to detect the fuel property based on the system identification theory by using the fuel and air transport system model in which the input information is taken as the supply air-fuel ratio. The supply air-fuel ratio used as the input information of the fuel and air transport system model is defined by a relationship between the injection amount and the introduced air amount. The supply air-fuel ratio is used as the input information. Therefore, it is possible to improve the detecting accuracy of the fuel property, because the phase of the injection amount and the introduced air amount is synchronized in the fuel and air transport system model.

In the present invention, the air-fuel ratio includes a weight ratio of the air amount A and the fuel amount F (A/F), the air excess rate $\lambda$, the fuel excess rate $1/\lambda$ and various physical amount defined by the relationship between the air amount and the fuel amount. Therefore, the input information of the fuel and air transport system model can be taken as the A/F, the air excess rate $\lambda$ or the fuel excess rate $1/\lambda$.

Further, it is preferable to use a filtering means to remove a low frequency disturbance (drift, offset and trend). The disturbance is contained in the supply air-fuel ratio and the output of the air-fuel ratio sensor used in the calculation of the fuel property parameter. As a result, it is possible to improve the detecting accuracy of the fuel property, because it removes the low frequency disturbance which is a cause of the deterioration of the detecting accuracy of the fuel property.

Further, it is preferable to synchronize the phases of the input and output information of the fuel and air transport system model by correcting the supply air-fuel ratio. The correction of the supply air-fuel ratio is the delay correction using the sensor model modeling the delay until the air-fuel ratio sensor detects the air-fuel ratio in exhaust gas. As a result, the influence of the sensor noise is suppressed, because the noise of the air-fuel ratio sensor is not amplified in the same manner as the above case. Additionally, the calculating accuracy can be improved, because it is not necessary to use the future value, and it is possible to process by using the data which are all known.

Further, it is preferable to learn the time constant of the sensor model by a learning means after warm-up of the internal combustion engine is completed. That is, the detection delay is generated by both of the difference of the fuel property and the time constant of the sensor model before completion of warm-up of the internal combustion engine (during warm-up). However, after completion of warm-up, the generating wet amount and the evaporating wet amount are balanced, because the temperature of the inner wall of the intake port is high to decrease the adhering amount of the injected fuel on the intake port. Therefore, the detection delay by the difference of the fuel property almost disappears. As a result, after completion of the warm-up, it is possible to learn the time constant of the sensor model, because the cause of the detection delay is only the time constant of the sensor model. The time constant of the sensor model is learned and renewed. Therefore, the calculating accuracy can be improved, by canceling the error according to the difference (deviations) and a deterioration with age of the system.

BRIEF DESCRIPTION OF THE DRAWINGS

Additional objects and advantages of the present invention will be more readily apparent from the following detailed description of preferred embodiments thereof when taken together with the accompanying drawings in which:

FIG. 5A is a time chart showing a behavior of the C/I;

FIG. 5B is a time chart showing a behavior of a $\Sigma C/\Sigma I$;

FIG. 14A is a map of a time constant T;

FIG. 14B is a map of a dead time L;

FIG. 15 is a map of a fuel property level Flevel;

FIG. 16 is a map of a coefficient Fpart;

FIG. 17 is a block diagram showing a system identification model;

FIG. 18 is a flowchart showing a program of a fifth embodiment;

FIG. 23 is a block diagram showing a system identification model of a seventh embodiment;

DETAILED DESCRIPTION OF PRESENTLY PREFERRED EXEMPLARY EMBODIMENTS

Preferred embodiments of the present invention are described hereinafter with reference to the accompanying drawings.

(first embodiment)

A first embodiment according to the present invention will be described below referring to FIGS. 1 to 5.

Figure 1:
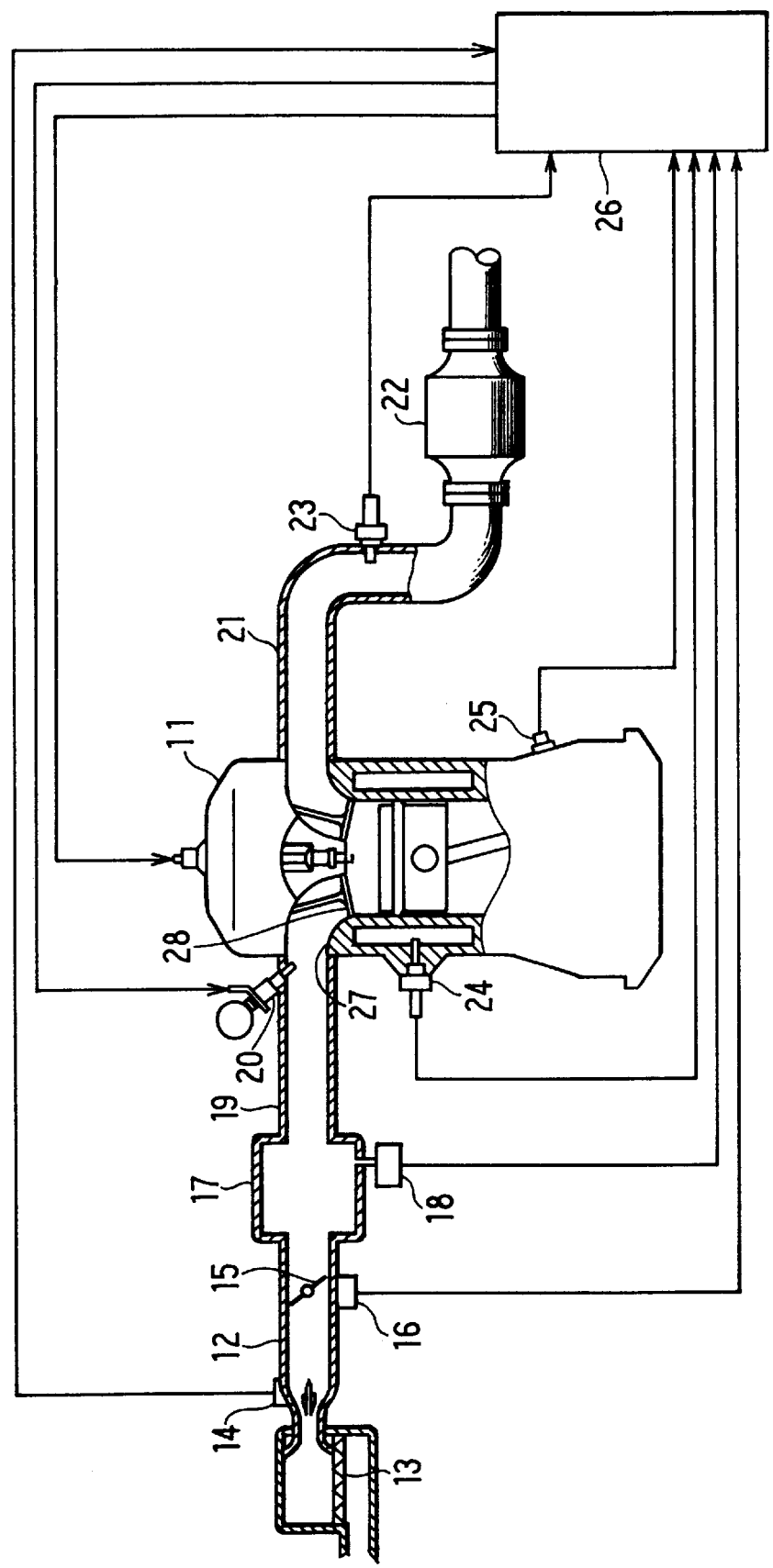
FIG. 1 is a schematic block diagram showing an engine control system of a first embodiment.

Referring to FIG. 1, the schematic construction of the engine control system will be described. An air cleaner 13 is provided in the most upstream portion of an intake pipe of an engine which is an internal combustion engine. An air-flow meter 14 for detecting an intake air amount Q is provided on the downstream side of the air cleaner 13. A throttle valve 15 and a throttle opening sensor 16 for detecting the opening degree of the throttle are provided on the downstream side of the air-flow meter 14.

A surge tank 17 is provided on the downstream side of the throttle valve 15. A sensor 18 for detecting an intake pressure P (hPa) and an intake temperature Ti (° C.) are provided in the surge tank 17. Further, an intake manifold 19 for introducing air into each cylinder of the engine 11 is provided on the surge tank 17. The intake manifold 19 has branch pipes for each cylinder. Fuel injection valves 20 are attached to the branch pipes respectively.

A catalyst 22 is provided on midway of an exhaust pipe of the engine. The catalyst 22 is a ternary catalyst or the like for reducing harmful components (Co, HC, NOx and others) in exhaust gas. An air-fuel ratio sensor 23 for detecting an air-fuel ratio A/F in exhaust gas (air-fuel ratio detecting means) is provided on the upstream side of the catalyst 22. A water temperature sensor 24 for detecting a water temperature Tw (° C.) representing an engine temperature and a crank angle sensor 25 for detecting an engine rotational speed NE (rpm) or the like are attached on a cylinder block of the engine 11.

The outputs of these various sensors are inputted into an engine control circuit (hereafter referred as an ECU). The ECU is constituted mainly by a micro-computer. The ECU executes a fuel injection control, an ignition control or the like according to engine operation conditions detected by the various sensors.

The fuel injection valve 20 injects fuel during the engine is running. A part of the injected fuel is directly introduced into the cylinders. But rest is adhered on the inner wall of the intake ports 27 and surface of intake valves 28. Then adhering fuel is evaporated and introduced into the cylinders gradually. Accordingly, a fuel amount Feng introduced into the cylinders varies according to a rate X of fuel adhering on the inner wall of the intake port 27 or the like and an evaporating rate of fuel. But, the adhering rate of fuel and the evaporating rate of fuel vary according to the fuel property. Therefore, the introduced fuel amount Feng varies according to the fuel property. In this embodiment, the introduced fuel amount Feng=the combustion amount C is used.

In this embodiment, the ECU 26 detects the fuel property based on the following theory, and corrects the injection amount I according to the fuel property. For instance, a fuel volatility is decreased as the fuel property becomes heavier, when the engine temperature is low because it is just after a starting of the engine. Therefore, a rate of fuel adhering on the inner surface of the intake port 27 is increased and an evaporating rate of fuel is decreased. Accordingly, the ratio C/I can be used as a parameter for evaluating the fuel property, because the ratio C/I varies according to the fuel property.

Figure 2:
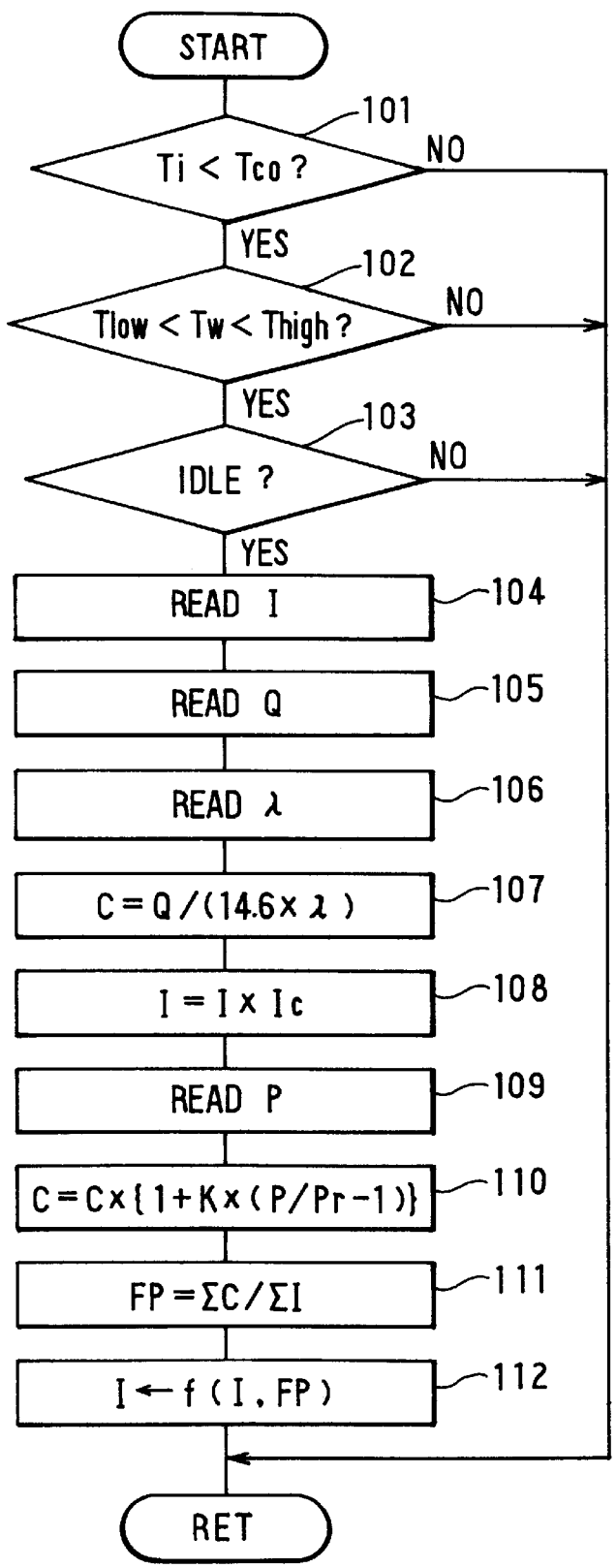
FIG. 2 is a flowchart showing a program of the first embodiment.

The ECU 26 calculates a fuel property parameter FP from the ratio C/I by the program of FIG. 2, and corrects the injection amount by the fuel property parameter, by using the relation ship.

Hereafter a process of the program of FIG. 2 will be described.

The program of FIG. 2 runs every injections.

First, at step 101–103, it is detected whether requirements for executing a fuel property detection is established or not. The requirements are following (1) to (3).

(1) The intake temperature Ti is lower than a restart judging value Tco (Ti<Tco) (step 101).

(2) The water temperature Tw is in a predetermined range (Tlow<Tw<Thigh) (step 102).

(3) Engine is in the idle operation (step 103).

In this case, it is detected whether it is the hot-restart or not, or whether the engine temperature is in a predetermined range or not, at step 101 and step 102. The temperature on the inner wall of the intake port 27 and the like is high and the fuel adhering amount (wet amount) is little, when the engine temperature is high or it is the hot-restart. Therefore, the detecting accuracy of the fuel property is lowered, because a difference of the combustion amount according to a difference of the fuel property becomes small. Accordingly, the detection of the fuel property is prohibited when it is the hot-restart and when the engine temperature is high. Further, an engine operation is not stable because the temperature is too low, when the water temperature Tw is lower than a lower limit temperature Tlow (ex. −10° C.). Therefore, the detecting accuracy of the fuel property parameter is lowered. Accordingly, the detection of the fuel property is also prohibited when the water temperature is lower than the lower limit temperature Tlow.

The calculating accuracy of the combustion amount is lowered, because of a delay of a behavior of the injected fuel, when the engine operational condition is changing. Accordingly, it is used as the requirement (3) that it is in the idle operation in which the engine operational condition is not changed.

The program is finished if any one of the above described requirements (1) to (3) is not established.

In the case all of the requirements (1) to (3) are established, processing proceeds to step 104, and the injection amount I of fuel of the fuel injection valve 20 is read. The injection amount of fuel is calculated by an injection amount calculating program (not shown) according to the engine operating condition. This function acts as the injection amount parameter calculating means in claims.

At the next step 105, the intake air amount Q detected by the air flow meter is read. At step 106, the air excess rate λ detected by the air-fuel ratio sensor 23 is read. After that, at step 107, the combustion amount C of fuel is calculated as C=Q/(14.6×λ).

After that, at step 108, the injection amount I of fuel is corrected to cancel an error in the system by I=I×Ic. The learned value Ic is calculated by a program of FIG. 3 which will be described later.

At step 109, the intake pressure P detected by the intake pressure sensor 18 is read. At step 110, the combustion amount C is corrected according to the intake pressure by the following expression:

$$C=C\times\{1+K\times(P/Pr-1)\}$$

In the above expression, the coefficient K is an adaptive value obtained by experiments or simulation. The reference pressure Pr is a reference intake pressure at the idle operation. The above expression calculates the combustion amount in which a part corresponding to a variation of the wet amount W generated by a variation of the intake pressure is corrected. The wet amount W varies according to the intake air amount, the engine rotational speed, the water temperature or the like. It can be used that the combustion amount is corrected by the intake air amount, the engine rotational speed, the water temperature or the like.

After the correction of the combustion amount C, the process proceeds step 111, the fuel property parameter F for evaluating the fuel property is calculated as a ratio of the accumulated value ΣC relative to the accumulated value ΣI during a predetermined time period. Here, for instance, a value accumulated from a predetermined number of times of calculation ago to the present, or a value accumulated from a predetermined time ago to the present can be used as the combustion amount accumulated value ΣC and the injection amount accumulated value ΣI.

After the calculation of the fuel property parameter FP, the process proceeds step 112, the injection amount I read at step 104 is corrected according to the fuel property parameter FP. The ECU 26 executes the fuel injection based on the corrected injection amount, by outputting an injection pulse corresponding to the corrected injection amount for the fuel injection valve 20.

The process of step 101 acts as the restart judging means and the fuel property detecting means. The process of step 107 acts as the combustion amount parameter calculating means. The process of step 108 acts as the learn-correcting means. The process of step 111 acts as the fuel property detecting means.

Figure 4A:
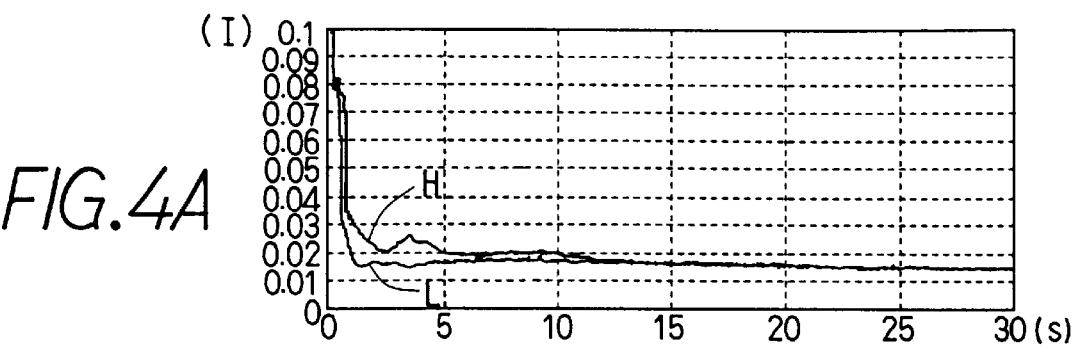
FIG. 4A is a time chart showing a behavior of an injection amount (I)
Figure 4B:
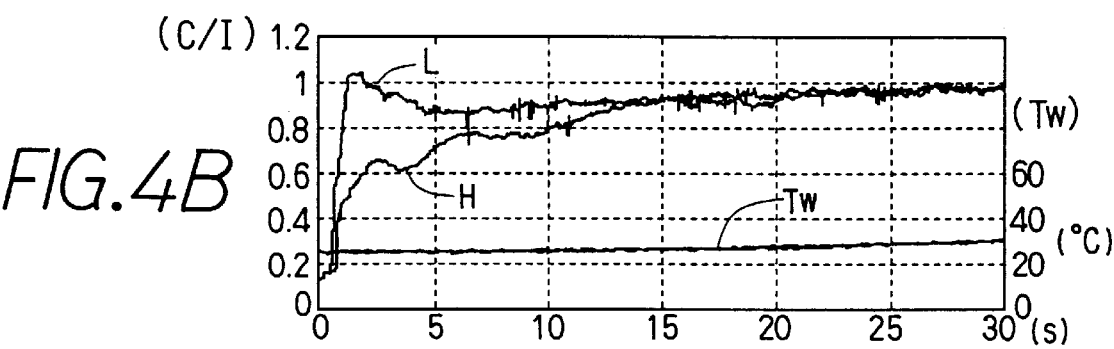
FIG. 4B is a time chart showing a behavior of a combustion amount/the injection amount (C/I)
Figure 4C:
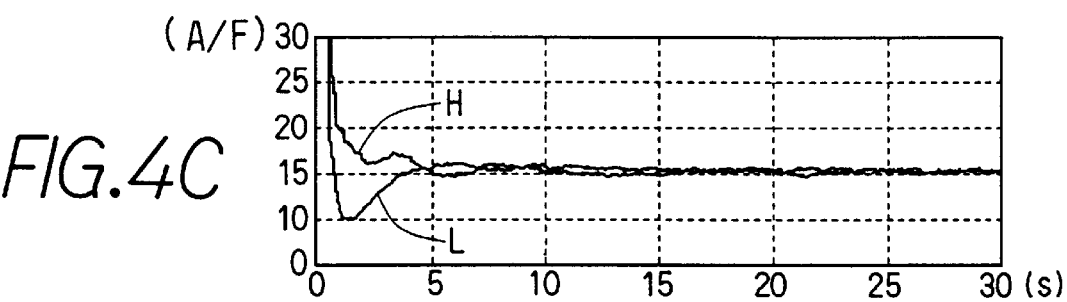
FIG. 4C is a time chart showing a behavior of an air-fuel ratio (A/F)
Figure 4D:
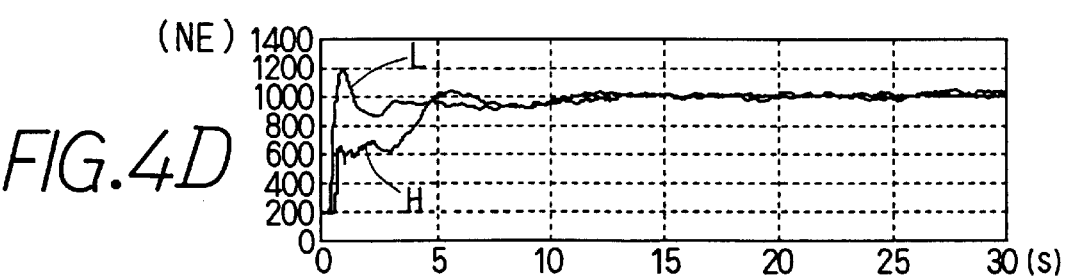
FIG. 4D is a time chart showing a behavior of an engine rotational speed (NE)
Figure 4E:
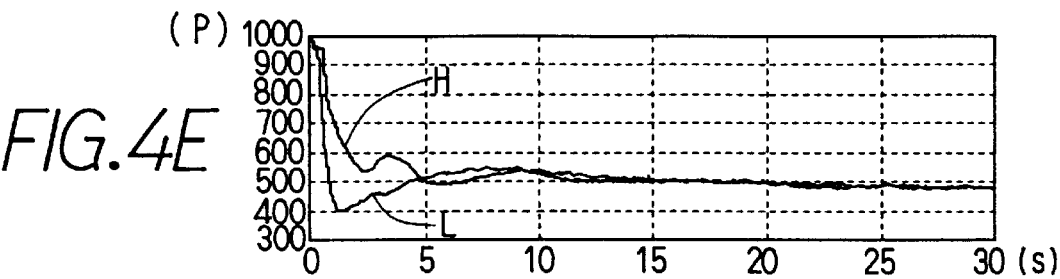
FIG. 4E is a time chart showing a behavior of an intake pressure (P)

As shown in FIG. 4B, even in a case that either the heavy fuel H or the light fuel L is used, the fuel adhering amount (wet amount) on the inner wall of the intake port 27 or the like and the evaporating amount are balanced when the engine temperature rises to a certain level after the starting of the engine. Then, the injection amount and the combustion amount of fuel are equalized (C/I becomes substantially 1). Accordingly, if there is a difference between the injection amount and the combustion amount when it rises to such the temperature, the difference should be considered as the difference based on the error of the system.

Figure 3:
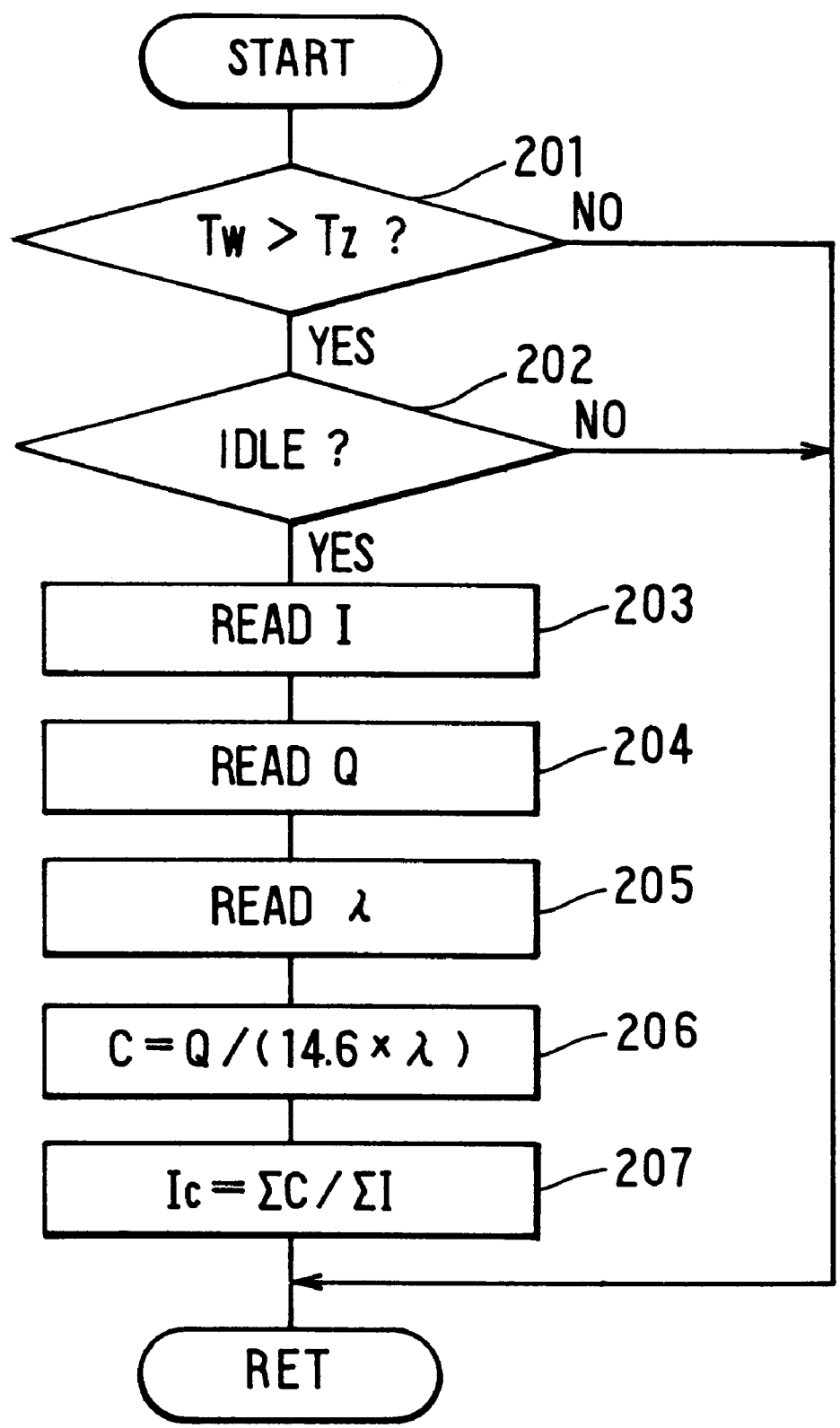
FIG. 3 is a flowchart showing a program of the first embodiment.

In this embodiment, the ECU 26 executes the program shown in FIG. 3. The ECU 26 learns the relationship between the combustion amount and the injection amount and calculates the learned value Ic for correcting the system error when the engine temperature is not less than the predetermined temperature. The program of FIG. 3 runs every injection, and acts as the learning means recited in claims. When the program runs, first, at steps 201 and 202, it is judged that whether both of the following requirements (1) and (2) are established or not:

(1) The water temperature Tw is not less than a predetermined temperature Tz (step 201); and (2) It is in the idle operation (step 202).

Here, the predetermined temperature Tz is the temperature at he injection amount and the combustion amount of fuel are substantially equalized. The injection amount and the combustion amount of fuel are equalized after the starting of the engine and before the completion of warm-up. The predetermined temperature may be designed lower temperature than a temperature indicating completion of warm-up. The fuel property parameter is calculated while the idle operation. That is the reason for calculating the learned value while the idle operation.

In a case that any one of the requirements are not established, the program is finished.

In contrast, in a case that both the requirements (1) and (2) are established, the process proceeds step 203, the injection amount I of fuel by the fuel injection valve is read. At step 204, the intake air amount is read. At step 205 the air excess rate λ is read. At step 206 the combustion amount C of fuel is calculated as C=Q/(14.6×λ).

At step 207, the learned value Ic is calculated based on the ratio ΣC/ΣI.

In the above described embodiment 1, the attention is directed to that the ratio of the injection amount relative to the combustion amount of fuel varies according to the fuel property. It is designed that the ratio of the injection amount relative to the combustion amount is calculated as the fuel property parameter for evaluating the fuel property. It is possible to detect the fuel property accurately without using the fuel property sensor. Therefore, it is possible to improve the correcting accuracy of the injection amount by the fuel property, to realize the air-fuel ratio control which does not depend on the influence of the fuel property, to decrease the emissions and to improve the driveability and the fuel consumption.

Additionally, the combustion amount of fuel is calculated by using the intake air amount and the air-fuel ratio of the exhaust gas (air excess rate) which are detectable by the sensor (the airflow meter 14 and the air-fuel ratio sensor 23) generally disposed for the air-fuel ratio control. Then, it is not necessary to dispose sensors for detecting the combustion amount. Therefore, it is possible to establish the requirements to decrease the number of parts and to cut down the cost.

Further, in the first embodiment, the fuel property parameter is calculated from the ratio ΣC/ΣI. Therefore, it is possible to suppress the influence of the variation of the engine operating conditions and the influence of the noise, and to improve the detecting accuracy of the fuel property. According to a result of a test by the inventors, it is proved that the behavior of the ratio ΣC/ΣI shown in FIG. 5B can provide the following results relative to the behavior of the ratio C/I shown in FIG. 5A. It suppresses the influence of the noise and the influence of the variation of the engine operating condition. It clearly discriminates between the heavy fuel H and the light fuel L. The accumulated values ΣC and ΣI are accumulated value of 100 data. However, in a region that the influence of the noise and the influence of the engine operating condition do not provide any problems, the fuel property can be detected from the C/I without using of the $\Sigma C/\Sigma I$. Further, an average value in a predetermined time or a smoothed value can be used instead of the accumulated value of the injection amount ant the combustion amount.

Further, in the first embodiment, the attention is directed to a point that the wet amount W varies according to the intake pressure. It is possible to provide a stable detection of the fuel property which does not depend on the intake pressure, because the combustion amount of fuel is corrected according to the intake pressure.

The wet amount varies according to the intake air amount, the engine rotational speed, the water temperature or the like except for the intake pressure. Then, it can be used that the combustion amount is corrected according to the intake air amount, the engine rotational speed, the water temperature or the like. It can be used that the injection amount, the fuel property parameter (the relationship between the injection amount and the combustion amount) or the calculating expression of the fuel property parameter is corrected according to the engine operating condition including the intake pressure or the like.

In the first embodiment, the attention is directed to the point that the system error can be learned based on the relationship between the combustion amount C and the injection amount I at the engine temperature is not less than the predetermined temperature. The injection amount of fuel is corrected by using of the learned value Ic learned at the engine temperature is not less than the predetermined temperature. Therefore, it is possible to provide a high-accuracy fuel property detection in which the system error is removed.

It can be used that the combustion amount, the fuel property parameter (the relationship between the injection amount and the combustion amount) or the calculating expression of the fuel property parameter is corrected by using the learned value.

(second embodiment)

Figure 6:
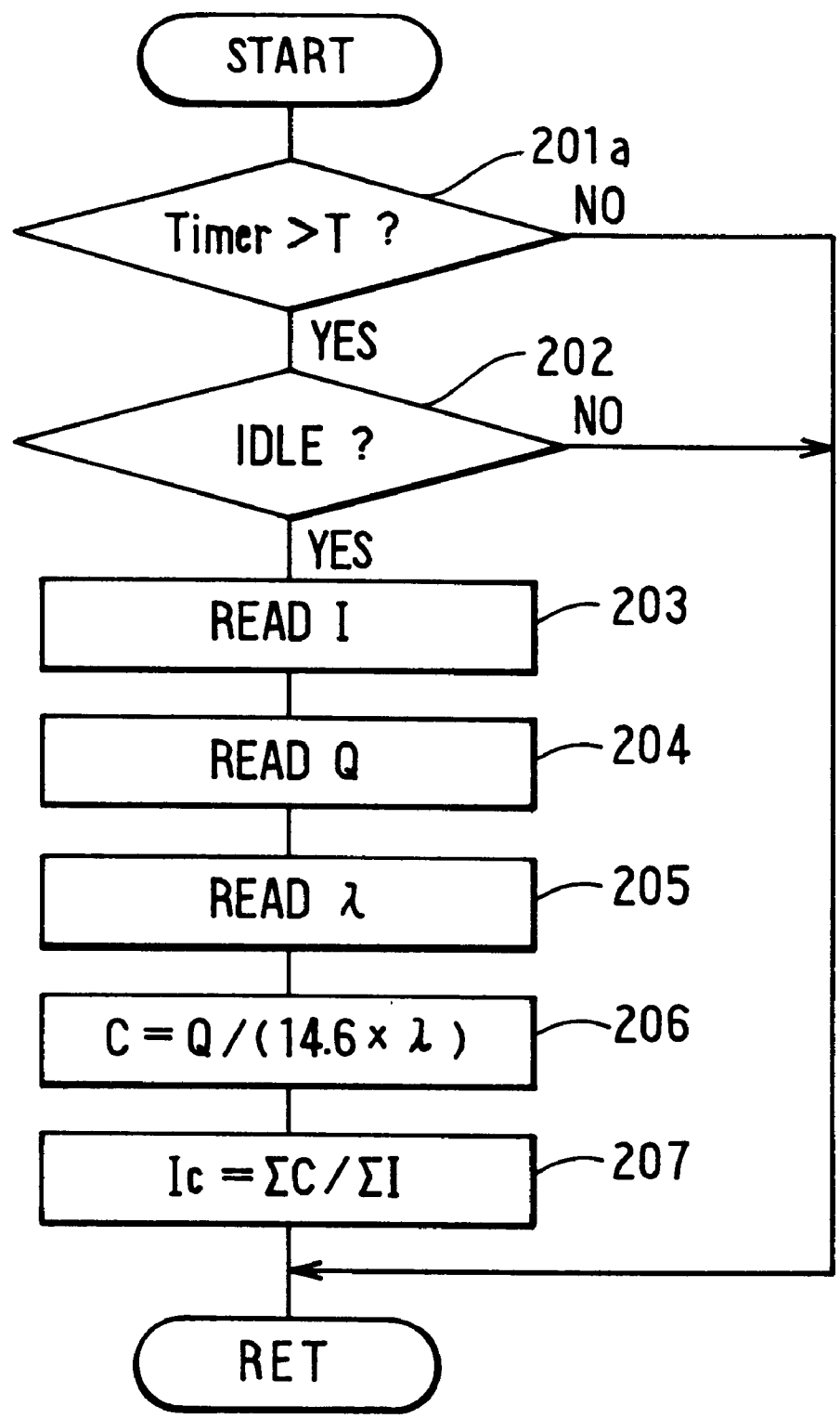
FIG. 6 is a flowchart showing a program of a second embodiment.

In the second embodiment, the learned value for correcting the system error is calculated by the program of FIG. 6.

In the second embodiment, it is considered that the engine temperature is not less than the predetermined temperature Tz where the injection amount and the combustion amount of fuel are equalized after the predetermined time has elapsed from the starting. One of the requirements for the learning is that an elapsed time Timer from the starting of the engine is not shorter than a predetermined time T (step 201a). The predetermined time T can be a stable value, but can vary according to the engine temperature (the water temperature) at the starting. The process for calculating the learned value after step 202 is the same as the above described program of FIG. 3.

In this second embodiment, similar to the first embodiment, it is possible to calculate the learned value for canceling the system error, and to detect the fuel property accurately by canceling the system error.

Third embodiment

The wet amount increases as the fuel property becomes heavier. Simultaneously, the ratio of a combustion fuel excess rate (the reciprocal of the air excess rate in exhaust gas) relative to a fuel supply excess rate (the reciprocal of the air excess rate in supply mixture) is decreased. Then, the relationship between the fuel supply excess rate and the combustion fuel excess rate varies according to the fuel property. Therefore, the ratio of the combustion fuel excess rate relative to the fuel supply excess rate is a parameter for evaluating the fuel property.

Figure 7:
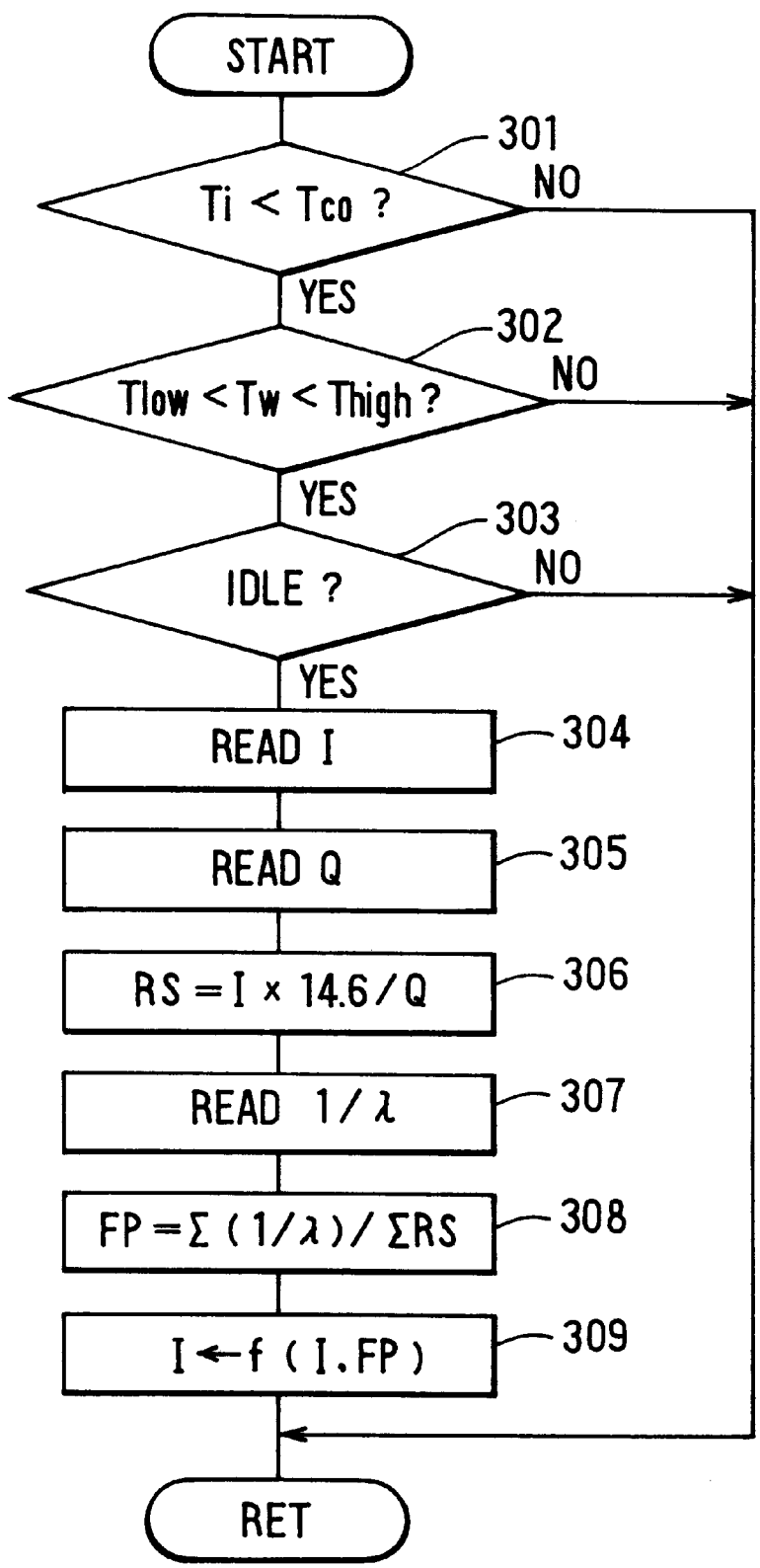
FIG. 7 is a flowchart showing a program of a third embodiment.

In the third embodiment, the fuel property parameter is calculated from the ratio of the combustion fuel excess rate relative to the fuel supply excess rate by program of FIG. 7. The injection amount is corrected by the fuel property parameter. The third embodiment is adopted to the system that the air-fuel ratio is controlled by calculating the combustion fuel excess rate from the output signal of the air-fuel ratio sensor 23.

In the program of FIG. 7, similar to the first embodiment, first, at steps 301 to 303, it is detected that whether the requirements are established or not.

At step 304, the injection amount I of fuel from fuel injection valve is read. At next step 305, the intake air amount Q is read. At step 306, the fuel supply excess rate RS is calculated by using the injection amount I, the stoichiometric air-fuel ratio (14.6) and intake air amount Q and as $RS=I\times 14.6/Q$.

After that, at step 307, the combustion fuel excess rate $1/\lambda$ of exhaust gas detected by the air-fuel ratio sensor 23 is read. At step 308, the fuel property parameter FP for evaluating the fuel property is calculated based on a ratio $\Sigma(1/\lambda)/\Sigma RS$. The ratio $\Sigma(1/\lambda)/\Sigma RS$ is the ratio of an accumulated value $\Sigma(1/\lambda)$ of the combustion excess rate $1/\lambda$ relative to an accumulated value $\Sigma RS$ of the fuel supply excess rate during a predetermined time period.

After the calculation of the fuel property parameter FP, at step 309, the injection amount I read at step 304 is corrected according to the fuel property parameter FP.

In the Above described third embodiment, it is possible to detect the fuel property accurately without the using of the fuel property sensor. Additionally, it applies to the system that the combustion excess rate $1/\lambda$ is obtained from output signal of the air-fuel ratio sensor 23. Therefore, it is possible to simplify the calculating process, because the process for obtaining the combustion excess rate $1/\lambda$ is extremely simplified.

In the third embodiment, the intake pressure, the other operating condition parameter (the intake air amount, the engine rotational speed, the water temperature or the like) or the learned value can be used for the correction. Such a correction can apply to the one of the fuel supply excess rate or the combustion fuel excess rate, the fuel property parameter (the relationship between the injection amount and the combustion amount) or the calculating expression (the fuel property detecting criterion) of the fuel property parameter.

In the above described embodiment, the fuel property is detected by comparing the accumulated value of the injection amount parameter (the injection amount or the fuel supply excess rate) and the accumulated value of the combustion amount parameter (the combustion amount or the combustion fuel excess rate) during the predetermined time period. However, the difference between the injection amount parameter and the combustion amount parameter is the parameter for evaluating the wet amount adhered on the inner wall of the intake port 27. Therefore, it can be used that the fuel property is detected by comparing an accumulated value of the difference between the injection amount parameter and the combustion amount parameter and an accumulated value of the injection amount parameter during a predetermined time period. In this case, it is also possible to detect the fuel property accurately.

It can be used that the fuel property is detected while the stable operation where the engine operating condition is stable. It can be used that the accumulated value is reset when the transient operating condition happens while accumulating the injection amount parameter or the combustion amount parameter, and then the accumulating process is restarted when the stable operating condition returns. Further, it can be detected whether it is just after the refueling or not. The fuel property can be detected only when it is just after the refueling. Such a detection result can keep until next refueling.

Further, in the present invention, the calculating expression of the fuel property parameter can be changed and the fuel property can be obtained from a map.

(fourth embodiment)

Hereafter, a fourth embodiment will be described referring to FIGS. 8 to 16.

Figure 8:
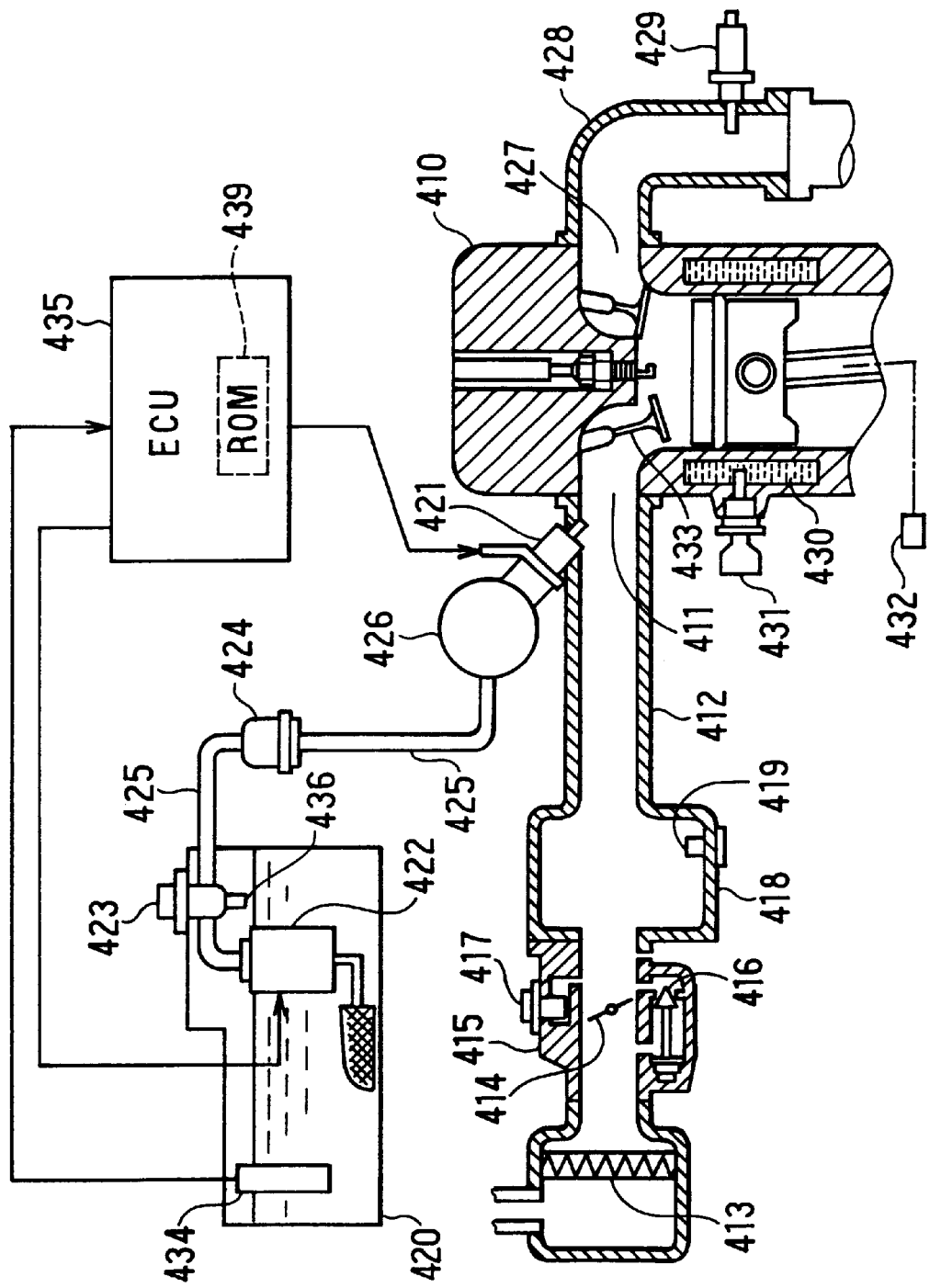
FIG. 8 is a schematic block diagram showing an engine control system of a fourth embodiment of the present invention.
Figure 9:
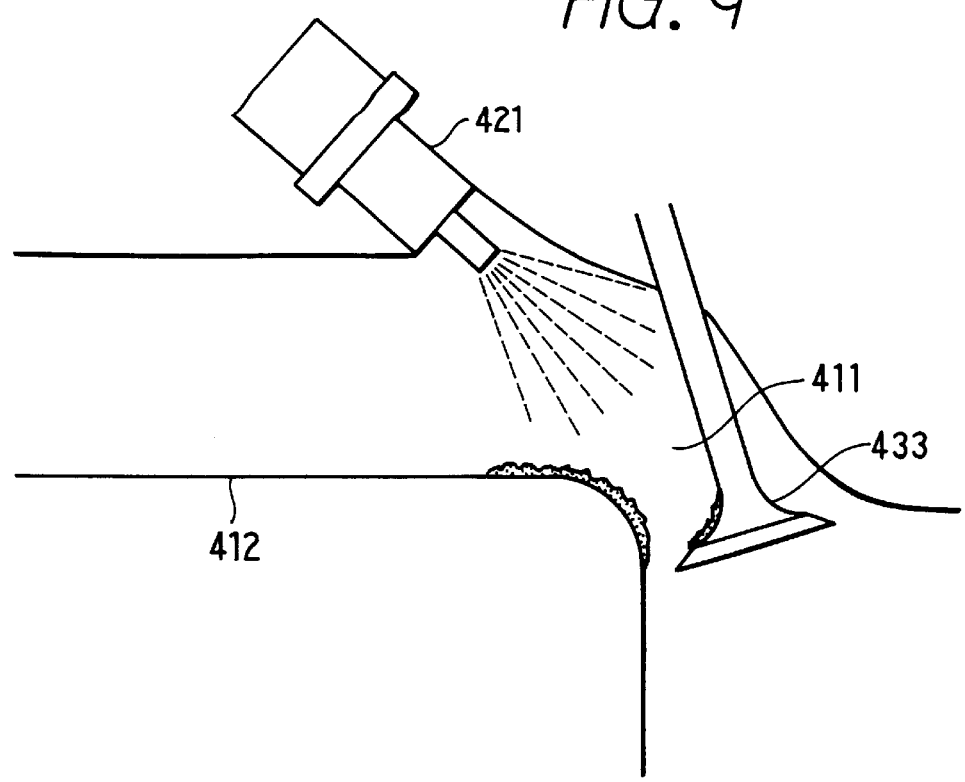
FIG. 9 is a vertical cross sectional view showing a construction of a fuel supply system.

First, the construction will be described by FIG. 8. An air cleaner 413 is provided in the most upstream portion of an intake pipe 412 of an engine 410 which is an internal combustion engine. A throttle valve 414 is provided downstream side of the air cleaner 413. An idle speed control valve 416 and intake pressure sensor 417 are provided on a throttle body 415 accommodating the throttle valve 414. The idle speed control valve 416 adjusts an intake air amount bypassing the throttle valve 414. The intake pressure sensor 417 detects the intake pressure Qm. A surge tank 418 is provided on the downstream side of the throttle valve body 415. An intake temperature sensor 419 for detecting an intake temperature Ti (° C.) is provided in the surge tank 418.

Fuel injection valves 421 injecting fuel supplied from a fuel tank 420 are attached to intake port 411 of each cylinder. A Fuel pump 422 pumps up fuel in the fuel tank 420, and sends fuel to a delivery pipe 426 through a fuel pipe 425, a pressure regulator 423 and a fuel filter 424. The delivery pipe 426 delivers fuel to the fuel injection valves 421 of each cylinder. An excess part of fuel sent from the fuel pump 422 to the pressure regulator 423 is returned through a fuel return port 436 of the pressure regulator 423. A fuel level sensor 434 for detecting a fuel level FL is provided in the fuel tank 420.

An air-fuel ratio sensor 429 for detecting air-fuel ratio λ of exhaust gas is provided on an exhaust pipe 428 connected to an exhaust port 427 of the engine 410. A catalyst (not shown) is provided on the downstream side of the air-fuel ratio sensor 429. A water temperature sensor 431 (corresponds to the engine temperature detecting means) for detecting water temperature Tw is attached on a water jacket 430 for cooling the engine 410. A rotational speed NE of the engine 410 is detected by a frequency of the pulse signal generated every predetermined crank angle from a crank angle sensor 432.

The outputs of these various sensors are inputted into an engine control circuit (hereafter referred as an ECU) 435. The ECU 435 reads the signals of the intake air temperature Ti, the intake pressure Qm, the water temperature Tw, the engine rotational speed NE and the air-fuel ratio λ detected by the sensors. The ECU 435 performs as the injection amount calculating means for calculating the injection amount of fuel according to a program stored in a ROM 439 (recording medium). The ECU 435 calculates an ignition timing to execute an ignition control during the engine is running. The ECU 435 detects the property of fuel according to the program of FIGS. 12 and 13 stored in the ROM 439, and corrects the injection amount according to the fuel property.

In this embodiment, an evaporating time constant τ is used as a value indicating an amount of evaporating fuel. The evaporating time constant τ of fuel varies according to the fuel property. In this embodiment, the fuel property is detected by obtaining a fuel property parameter a1 depending on the evaporating time constant τ of fuel.

In this embodiment, it is used that a fuel transport system model in which the injected fuel is transported to and introduced into the cylinders. The fuel transport system model is represented by expression (1) and (2) called the AKINO formula. A differential dFmw/dt of the wet amount Fmw is a difference between a newly adhering fuel amount NW and an evaporating fuel amount EW. The NW is indicated by the injection amount Finj and the adhering rate X of fuel. The EW is indicated by the time constant τ0 according to the evaporation of fuel and the wet amount Fmw.

A fuel amount Feng introduced into the cylinders is a sum of a fuel amount DF directly introduced and a fuel amount EW evaporated.

$$\frac{dFmw}{dt} = NW - EW = X \cdot Finj - \frac{1}{\tau} \cdot Fmw \tag{1}$$

$$Feng = DF + EW = (1 - X) \cdot Finj + \frac{1}{\tau} \cdot Fmw \tag{2}$$

The expression is obtained by applying the Laplace transformation to the above expressions (1) and (2) and rearranging.

$$\frac{Feng}{Finj} = \frac{1 + \tau s(1 - X)}{1 + \tau s} \tag{3}$$

Additionally, the following transform function of a digital system is obtained by applying the z transformation to the above expression.

$$\frac{Feng}{Finj} = \frac{b_0 + b_1 \cdot z^{-1}}{1 - a_1 \cdot z^{-1}} \tag{4}$$

$$b_0 = 1 - X \qquad b_1 = X - e^{-\frac{\Delta t}{\tau}} \qquad a_1 = e^{-\frac{\Delta t}{\tau}}$$

The parameter a1 in the above expression represents the fuel property which varies dependently on the evaporating time constant τ of fuel. Accordingly, it is possible to detect the evaporating time constant τ and the fuel property, by obtaining the parameter a1.

The parameter a1 is calculated by using the system identification theory. The system identification theory calculates the parameters of transfer function of the control object by using the input and output information of the control object. In the case, the control object is the fuel transport system model, the input information is the injection amount Finj of fuel injected from the fuel injection valve 21 and the output information is the fuel amount (introduced fuel amount) Feng actually introduced into the cylinders.

The injection amount Finj as the input information of the fuel transport system model is a known value since it is calculated in the ECU 435. The introduced fuel amount Feng as the output information can't be detected directly. Therefore, in this embodiment, the attention is directed to that air-fuel ratio of exhaust gas varies as a variation of the introduced fuel amount Feng. The air-fuel ratio of exhaust gas is detected by the air-fuel ratio sensor, and the introduced fuel amount Feng is predicted based on the air-fuel ratio of exhaust gas. This introduced fuel amount Feng is the combustion fuel amount.

However, there are delays until the output variation of the fuel transport system model appears on the output of the air-fuel ratio sensor 429. There is a delay (flow delay) until the gas in the cylinder flows to the air-fuel ratio sensor 429 through the exhaust pipe 428 after an elapse of each stroke such as introduction, compression, expansion and exhaust. There is a delay (detection delay) based on a response characteristic of the air-fuel ratio sensor 429. Accordingly, in a case that the output information of the fuel transport system model is predicted based on the output of the air-fuel ratio sensor 429, it is necessary to synchronize the phases of the input and output information.

In a case that the phases of the input and output information are synchronized, there are two ways. The first is a method for synchronizing the phases of the input and output information by advancing the phase of the output information predicted from the output of the air-fuel ratio sensor 429. The second is a method for synchronizing the phases of the input and output information by delaying the phase of the input information.

In the former one, as shown in FIG. 17, it is used that a sensor model which models the flow delay from the fuel transport system to the air-fuel sensor 429 and the detection delay of the air-fuel sensor 429. It is also used that a reversal model which obtained by modeling the relationship of the input and output of the sensor model reversely. The phases of the input and output information are synchronized by advancing the phase of he output information predicted from the output of the air-fuel ratio sensor 429. However, this method has a characteristic to amplify a sensor noise. Accordingly, it has a tendency to be influenced by the sensor noise and a disadvantage that a future value is required.

Figure 10:
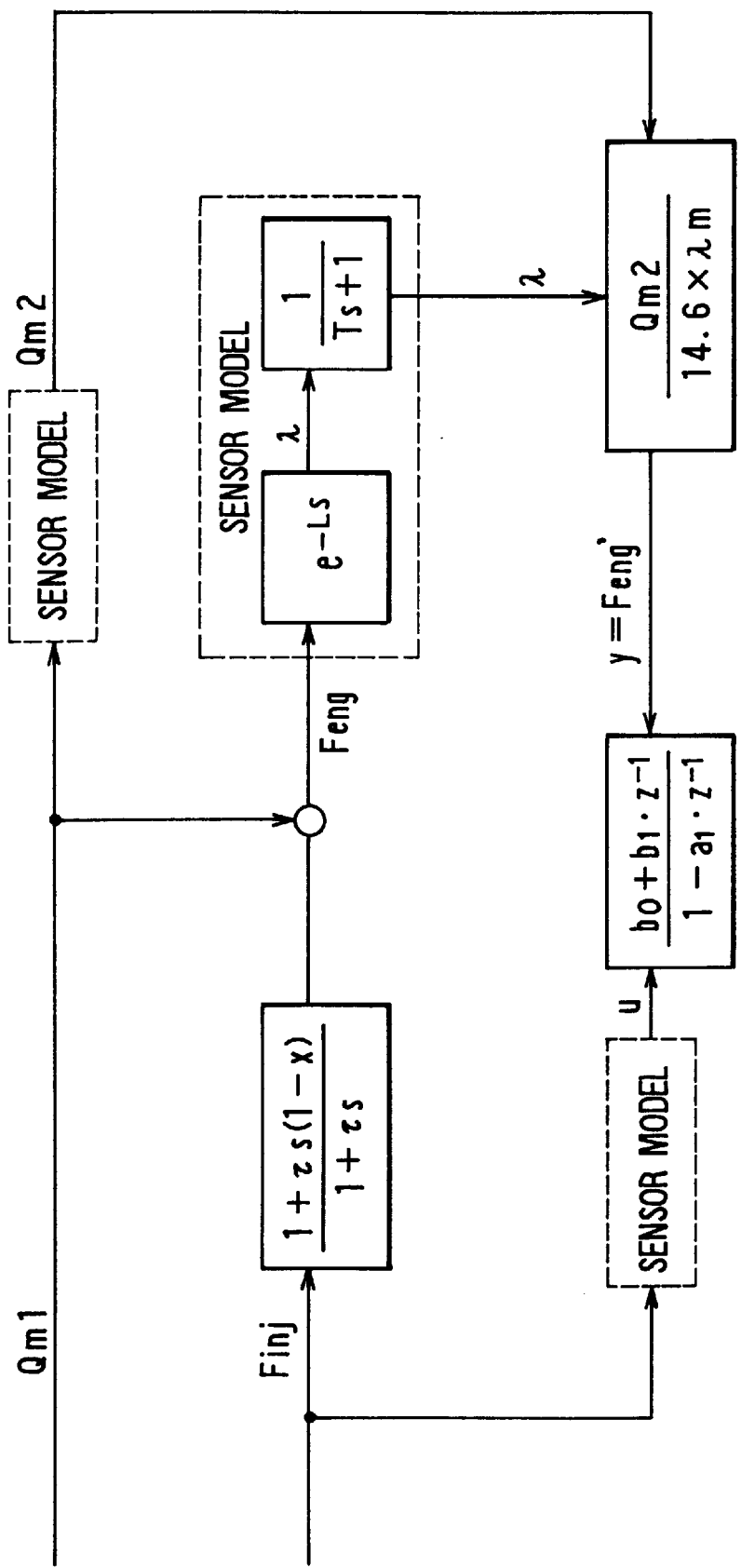
FIG. 10 is a block diagram showing a system identification model of the fourth embodiment.

To resolve this disadvantage, in this embodiment, the model shown in FIG. 10 is used. The phases of the input and output information are synchronized by delaying the phase of the input information. Specifically, it is used that the sensor model which models the flow delay from the fuel transport system to the air-fuel ratio sensor 429 and the detection delay of the air-fuel ratio sensor 429. The injection amount Finj is applied the delay correction based on the sensor model. Here, the flow delay is represented as $e^{-Ls}$, and the detection delay is represented as $1/(Ts+1)$. The L represents the dead time and the T represents the time constant of the air-fuel ratio sensor 429.

The introduced fuel amount Feng used for the output of the fuel transport system model is substantially the same as the fuel amount burned in the cylinders (combustion fuel amount). The combustion fuel amount Feng' is used as the substitutive information of the introduced fuel amount Feng. It is possible to calculate the combustion fuel amount Feng' based on the introduced air amount introduced into the cylinders and the output (air-fuel ratio in exhaust gas) of the air-fuel ratio sensor 429. However, the phase of the output of the air-fuel ratio sensor 429 has a delay (flow delay, detection delay) relative to the phase of a detected value of the introduced air amount Qm1. This delay is substantially the same as a delay which is modeled by the above-mentioned sensor model.

In the present invention, the introduced air amount Qm1 is applied the delay correction by using the sensor model. The combustion fuel amount Feng' is calculated as Feng'= Qm 2/(14.6×λm ). The expression uses the average air-fuel ratio λm during one cycle (720° CA), the delay corrected introduced air amount Qm2 and the stoichiometric air-fuel ratio (14.6). In the system identification model of the embodiment, the injection amount Finj applied the delay correction by the sensor model is taken as the input information u, and the combustion fuel amount Feng' calculated by the above expressions is taken as the output information y. The fuel property parameter a1 in the above expression (4) is predicted.

The prediction of the fuel property parameter a1 is executed by the following expression by using the method of least squares of the sequential type with weight (static trace method).

$$i\ y/u = (b0 + b1 \cdot z^{-1})/(1 - a1 \cdot z^{-1}) \tag{5}$$

In the expression (5), u is the injection amount Finj after the delay correction, and y is the combustion fuel amount Feng'. In a case that the method of least squares applies to the above expression, the calculation becomes a complex and the load of the CPU becomes heavy. Therefore, it can be used that the fuel property parameter a1 is predicted by the method least squares by using the following simplified expression (6).

$$y/u = (1-a1)/(1-a1 \cdot 1z^{-1}) \tag{6}$$

The method for predicting the fuel property parameter a1 by the method least squares will be described by using the expression (6).

A expression $u(i)-y(i)=a1(u(i)-y(i-1))$ is obtained from the expression (6).

Here, $Y(i)=u(i)-y(i)$ and $U(i)=u(i)-y(i-1)$ are assumed, $Y(i)=a1\ U(i)$ is obtained.

Figure 11:
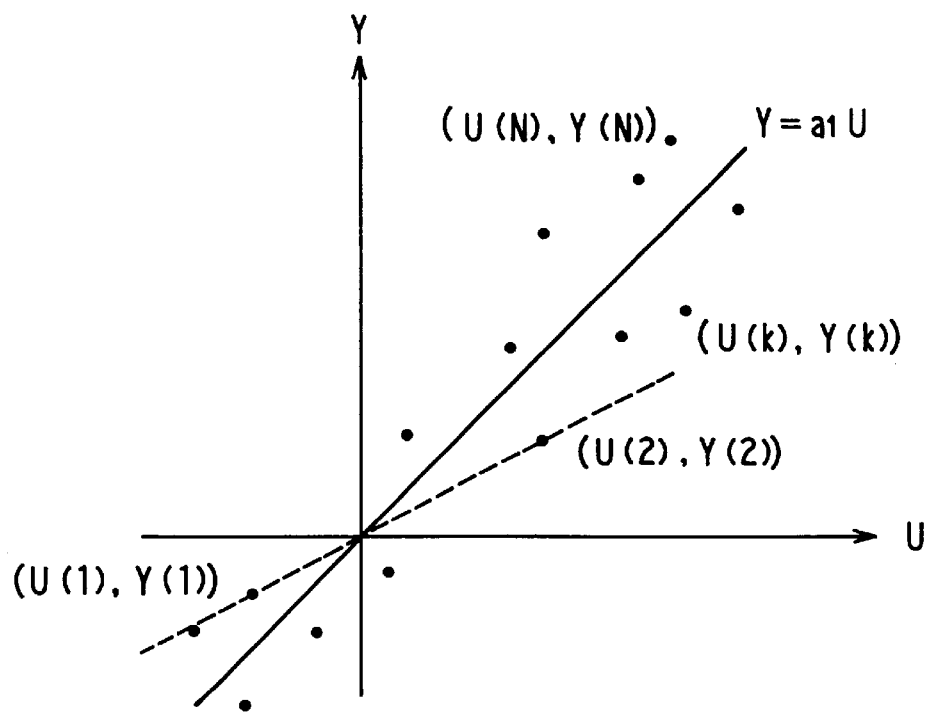
FIG. 11 is a graph for explaining a fuel property parameter a1.

As shown in FIG. 11, $Y(k)-a1\ U(k)$ is obtained as a difference between a detected data $(U(k),Y(k))$ and a line $Y=a1\ U$ which should be predicted. A total of squares of the differences J is obtained by the following expression. The break line shows a predicted value based on $(U(1),Y(1))$ and $(U(2),Y(2))$.

$$J = \sum_{k=1}^{N} (Y(k) - a1U(k))^2 \tag{7}$$

For obtaining the fuel property parameter a1 which makes the total of squares of the differences to minimum, the above expression is processed the partial differential according to a1. This expression is taken as 0, and is solved according to a1. Then, the expression (8) is obtained. It is possible to calculate the fuel property parameter a1 by using the expression (8).

$$\frac{\partial J}{\partial a1} = \sum_{k=1}^{N} \{-2U(k)(Y(k) - a1U(k))\} = 0 \tag{8}$$

$$\therefore a1 = \frac{\sum_{k=1}^{N} U(k)Y(k)}{\sum_{k=1}^{N} U(k)^2}$$

Figure 12:
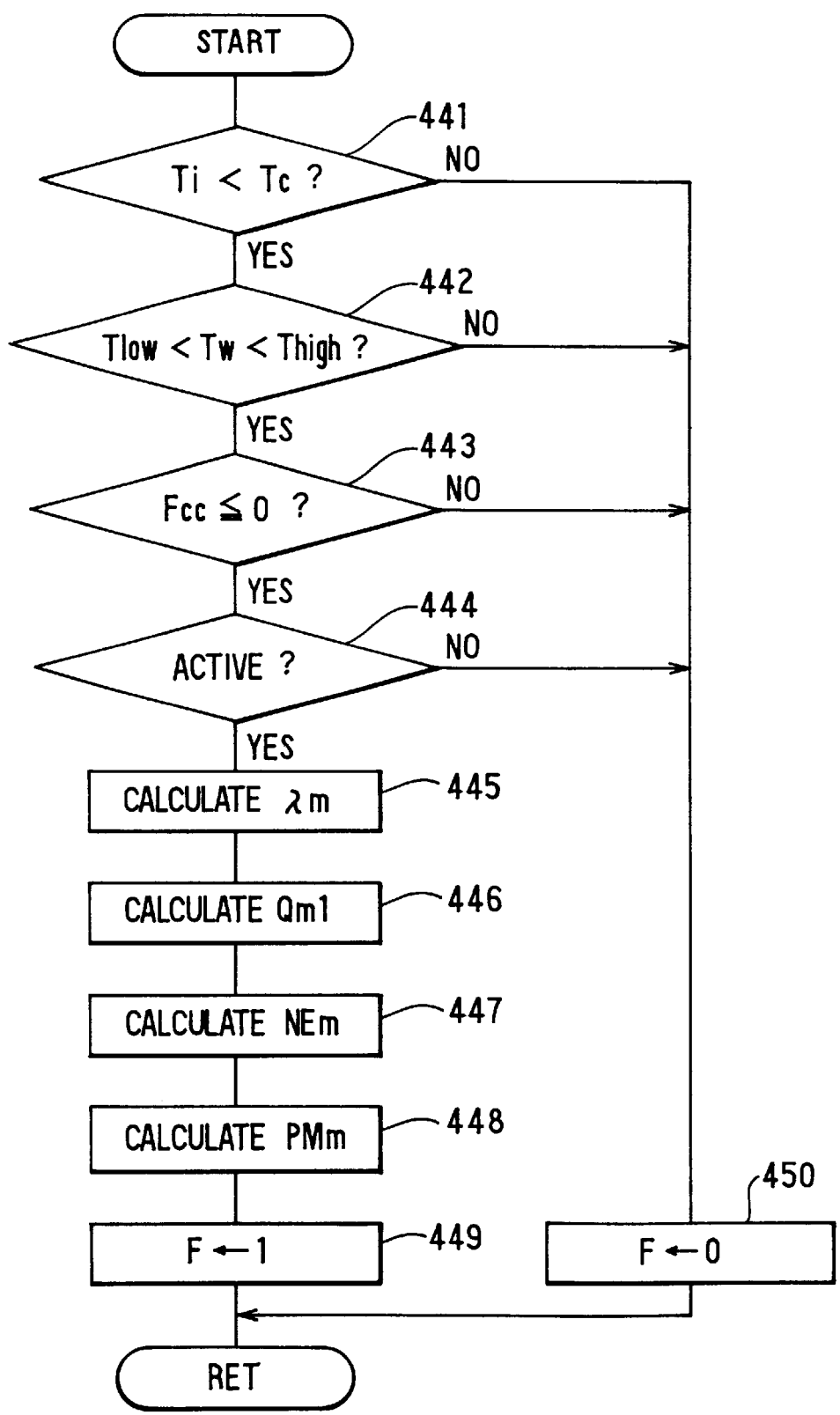
FIG. 12 is a flowchart showing a first program of the fourth embodiment.
Figure 13:
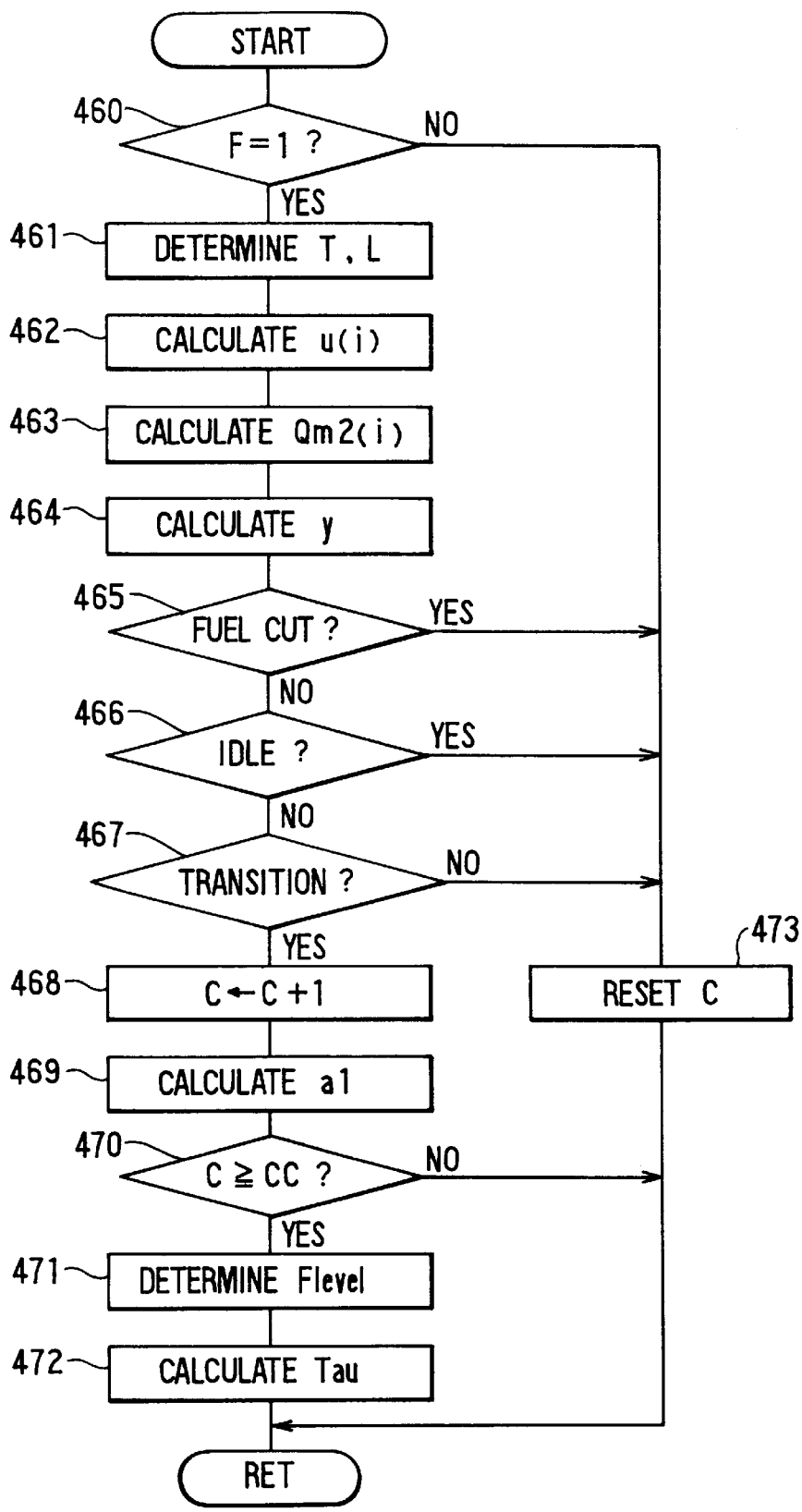
FIG. 13 is a flowchart showing a second program of the fourth embodiment.

The above described prediction of the fuel property parameter a1 is executed to follow the program of FIG. 12 and FIG. 13 by the ECU 435.

The program (1) of FIG. 12 is executed every predetermined crank angle (720° CA/number of cylinders). When the program (1) is started, first, at steps 441 to 444, it is detected that whether the requirements are established or not. The requirements are: (1) the intake air temperature Ti is lower than the restart judging value Tc (step 441); (2) the water temperature is in the predetermined range, that is, Tlow<Tw<Thigh (step 442); (3) the start enrichment correction value Fcc is 0 (step 443) and (4)the air-fuel ratio sensor is already activated (step 444).

In this case, (1) and (2) (steps 441 and 442) detects that whether it is the hot-restart or not, and whether the engine temperature is in the predetermined range. When the hot-restart or the engine temperature is high, the temperature of the inner wall of the fuel transport system is high and the adhering amount of fuel on the inner wall is little. Then, the variation of the introduced fuel amount according to the difference of the fuel property is little, and the calculating accuracy of the fuel property parameter a1 is lowered. Therefore, the data sampling for detecting the fuel property is prohibited when the hot-restart or the engine temperature is high.

The lower limit temperature compared at step 442 is for instance −10° C. The upper limit temperature Thigh is for instance 50 to 60° C. The engine operating condition is not stable because the temperature is too low when the water temperature is lower than the lower limit temperature Tlow. Therefore, the calculating accuracy of the fuel property parameter is lowered. Therefore, the data sampling for detecting the fuel property is prohibited when the water temperature is lower than the lower limit temperature Tlow.

There are possibilities that the forming of the wall surface adhering fuel is not enough as descried above, and the fuel property is erroneously detected. Accordingly, the data sampling is prohibited by (3) (step 443) until the start enrichment correction amount Fcc becomes 0. An influence by the start enrichment correction amount becomes small when the start enrichment correction amount becomes little. Therefore, it can be used that the data sampling for the fuel property detection is prohibited until the start enrichment correction amount becomes less than a predetermined value.

The air-fuel ratio sensor can't detect the air-fuel ratio accurately until its temperature raise to a predetermined value. Therefore, the data sampling is prohibited until the air-fuel ratio sensor 429 is activated.

In a case that any one of the requirements is not established, the process proceeds step 450, the flag F is reset to 0, then the program (1) is finished.

On the other hand, in a case that all of the requirements are established, the program proceeds step 445, the average air-fuel ratio during a cycle (720° CA) is calculated. At step 446, the average intake air amount Qm1 during a cycle is calculated. At step 447, the average engine rotational speed NEe during a cycle is calculated. At step 448, the average intake pressure PMm is calculated. At step 449, the data sampling flag F is set 1 which means a completion of the data sampling. Then, the program (1) is finished.

The process of steps 441 to 443 corresponds to the prohibiting means in claims. The process of steps 441 and 442 acts as the restart judging means. The process of step 446 acts as the intake air calculating means.

The program (2) of FIG. 13 runs every a cycle (720° CA). When the program (2) is started, at step 460, it is judged that whether the data sampling flag F is 1 or not. In a case that F=0 is detected, the fuel property can't detect. Therefore, the process proceeds step 473, a counter C is reset, the program (2) is finished.

On the other hand, F=1 is detected, the process proceeds step 461, the time constant T of the detection delay on the sensor model is calculated from the map of FIG. 14A according to the average intake pressure PMm and the average engine rotational speed NEm. That is, the detection delay T of the air-fuel ratio sensor 429 varies according to the engine operating condition (the engine rotational speed NEm and the intake pressure PMm). The detection delay T modeled by the sensor model is set according to the engine operating condition. Further, a flow speed of gas from fuel transport system to the air-fuel ratio sensor 429 also varies according to the engine operating condition. The dead time L of the flow delay is set by the map of FIG. 14B according to the engine operating condition (engine rotational speed NEm).

At step 462, the injection amount Finj calculated according to the engine operating condition is applied the delay correction by the following expression by using the time constant T of the sensor model. Then, the delay corrected injection amount u is obtained.

$$u(i)=T\times u(i-1)+(1-T)\times Finj(i-1)$$

In the above expression, (i) means the present value, and (i−1) means the last before value.

After that, at step 463, the average intake air amount Qm calculated at step 446 of FIG. 12 is applied the delay correction by the following expression by using the time constant T of the sensor model. Then, the delay corrected average intake air amount Qm2 is obtained.

$$Qm2(i)=T\times Qm2(i-1)+(1-T)\times Qm1(i-1)$$

After that, the process proceeds step 464, the combustion fuel amount y is calculated by the following expression by using the average air-fuel ratio λm, the delay corrected average intake air amount Qm2 and the stoichiometric air-fuel ratio (14.6).

$$y=Qm2/(14.6\times \lambda m)$$

After that, at steps 465 to 467, it is judged that whether the requirements for calculating the parameter are established or not. First, at step 465, it is judged that whether it is in fuel-cut or not. Fuel is not injected from the fuel injection valve 421 during the fuel cut. In contrast, the air-fuel ratio sensor 429 continues to detect air-fuel ratio of exhaust gas during the fuel cut. Therefore, it is possible to detect the fuel property. However, definite erroneous detection of the fuel property is carried out, if the detection of the fuel property is carried out during the fuel cut. Accordingly, in a case of the fuel cut, the process proceeds step 473, the counter C is reset and the program (2) is finished.

On the other hand, in a case of the absence of the fuel cut, the process proceeds step 466, it is judged that whether it is in the idle operation or not. In the idle operation, it is a kind of the steady operating condition. Then, the input and output of the fuel transport system model is maintained a constant. Therefore, the detection of the fuel property can't carry out, because the difference of the evaporating time constant of the fuel does not appear on the introduced fuel amount. Accordingly, in a case of the idle operation, the process proceeds step 473, the counter C is reset and the program (2) is finished.

In a case of the absence of the idle operation, the process proceeds step 467, it is judged that whether it is in the transient operating condition or not. In a case that it is not the transient operating condition (in the steady operating condition), the input and output of the fuel transport system model (the injection amount and the introduced fuel amount) are maintained constant. Therefore, the fuel property parameter a1 can't detect accurately, because the difference of the evaporating time constant of fuel does not appear on the introduced fuel amount (the output of the fuel transport system model). Accordingly, in a case of the absence of the transient operating condition, the process proceeds step 473, the counter is reset and the program (2) is finished.

On the other hand, in a case that all of the above described three requirements are established, the process proceeds step 468, the counter C is counted up. After that, at step 469, the fuel property parameter a1 is calculated by the following expression by using the injected amount u and the combustion fuel amount y.

$$Y(i)=u(i)-y(i)$$

$$U(i)=u(i)-y(i-1)$$

$$UU(i) = \text{LAMD} \times UU(i-1) + U(i) \times U(i)$$

$$YU(i) = \text{LAMD} \times YU(i-1) + Y(i) \times U(i)$$

$$a1 = YU(i)/UU(i)$$

uu(i): the denominator of the expression (8)
YU(i): the numerator of the expression (8)
LAMD: the coefficient for forgetting (weight of the past data)

The process of step 469 acts as the parameter calculating means in claims.

After the calculation of the fuel property parameter a1, the process proceeds step 470, it is judged that whether the count value of the counter C reaches the predetermined value CC or not.

If the count value of the counter C does not reach the predetermined value CC, the requirement is not established, and the program (2) is finished. That is, for instance, around 10 seconds is necessary to stabilize the fuel property parameter a1 from an establishment of three requirements (1) to (3) for the calculation of the fuel property parameter. Therefore, the detection of the fuel property is carried out after a stabilization of the fuel property parameter a1. Accordingly, the requirements for detecting the fuel property are taken as the following four.

(1) It is not in the fuel cut.
(2) It is not in the idle operation.
(3) It is in the transient operation.
(4) The predetermined time has elapsed from an establishment of above three requirements.

After that, in a case that the count value of the counter C reaches the predetermined value CC and above four requirements are established, the process proceeds step 471. At step 471, the map corresponding to the start water temperature Tws is selected from the maps of FIG. 15. Then, the fuel property level Flevel according to the fuel property parameter a1 and the water temperature is determined from the selected map. Here, the fuel property level Flevel is a number which is obtained by dividing the fuel property into five grades. The process of step 211 acts as the fuel property detecting means in claims. The fuel property level can be obtained by dividing into four or lesser grades, also into six or more grades. The fuel property level can be calculated by a functional equations.

After the calculation of the fuel property level Flevel, the process proceeds step 472, the injection amount Tau is corrected according to the fuel property level Flevel as follows. First, a coefficient Fpart according to the fuel property Flevel is calculated by using a map of FIG. 16. Then, the correction coefficient Ftotal is calculated as Ftotal=Fc+Fpart. The correction coefficient Fc includes various correction coefficient according to the engine operating condition such as a water temperature correction coefficient, a feedback correction coefficient, a coefficient for an acceleration and a deceleration or the like.

After that, the injection amount Tau is calculated as Tau=TP×Ftotal. The basic injection amount TP is calculated according to the engine operating condition.

The process at steps 465 to 468 and 470 acts as the property detection prohibiting means in claims. The process at step 465 acts as the fuel-cut detecting means. The process at step 466 acts as the idle detecting means. The process at step 467 acts as the transient detecting means in claims.

In the above described fourth embodiment, it is possible to detect the fuel property accurately. Additionally, number of parts is not increased, and it is possible to establish a requirement to cut down the cost.

In the fourth embodiment, the parameter a1 depending on the evaporating time constant of fuel on the fuel transport system model is calculated. The fuel property is determined from the parameter a1. However, it can be used that the evaporating time constant of fuel is calculated, and the fuel property is determined from the evaporating time constant.

(fifth embodiment)

Generally, change of the fuel property for consuming happens always at a case that the fuel tank is refueled with fuel having a different fuel property. Accordingly, it is preferable to detect the fuel property after the refueling.

In the fifth embodiment of the present invention shown in FIGS. 18 to 21, it is detected that whether the fuel tank 420 is newly refueled or not by the program of FIG. 18. The fuel property is detected by generating the transient operation condition according to program of FIGS. 19 and 20 while the first operation after the refueling. Hereafter, the process of the each program will be described.

The program of FIG. 18 is executed only one time after the starting of the engine. It acts as the refueling detecting means in claims. The program runs, at step 501, the fuel level (remaining fuel) in the fuel tank 420 detected by fuel level sensor 434 is read. At step 502, it is judged that whether the refueling is done or not by judging whether the present fuel level FL is increased from the fuel level FL0 at the last operation end. The fuel level FL0 at the last operation end is memorized in a non volatile memory such as a back up RAM or the like of the ECU 435. At step 502, in a case that it is judged that the present fuel level FL is not more than the fuel level FL0 at the last operation end, it is judged that the refueling is not done, and the program is finished. On the other hand, in a case that the present fuel level FL is increased from the fuel level FL0 at the last operation end, it is judged that the refueling is done. Then, the process proceeds step 503, a flag XFL is set 1 meaning the refueling is done, and the program is finished. The flag XFL has initially set as XFL=0 (the refueling is not done) by an initializing program which runs just after the power is supplied to the ECU 435.

Figure 19:
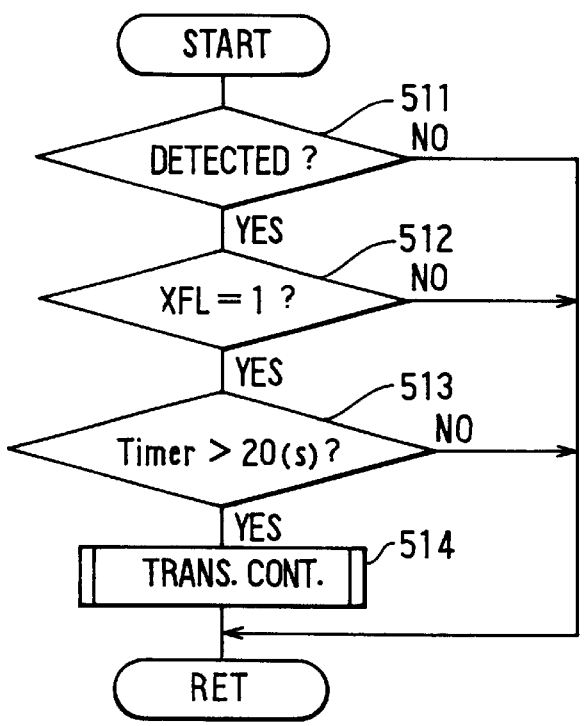
FIG. 19 is a flowchart showing a program of a fifth embodiment.

The program of FIG. 19 is executed every predetermined time or every predetermined crank angle after the starting of the engine. The program runs, at step 511, it is judged that whether the fuel property has detected or not. In a case that the detection has done, the program is finished because it is not necessary to generate the transient operating condition forcedly.

In a case that the detection has not done, the process proceeds step 512, it is judged that whether the refueling is done or not by detecting whether the flag FLX=1 or not. In a case that XFL=0, the after process is not executed, and the program is finished.

On the other hand, in a case that XFL=1, the process proceeds step 513, it is judged that whether a predetermined time (for instance 20 seconds) from the starting of the engine has elapsed or not by a count value Timer of the time counter counting an elapsed time from the starting of the engine. In a case that the time has not elapsed, the program is finished. It prevents an enhancement of the engine rotational fluctuation.

Figure 20:
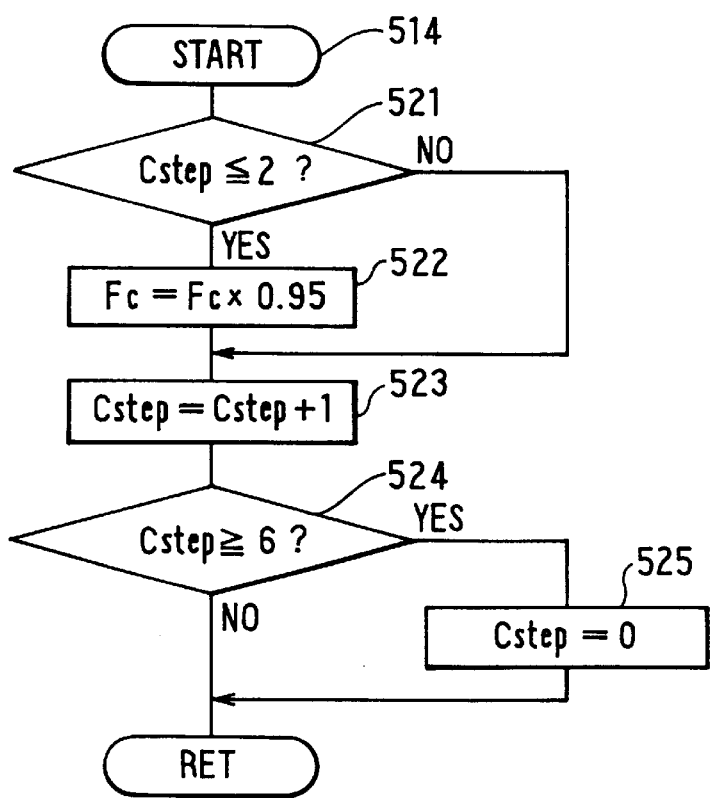
FIG. 20 is a flowchart showing a program of a fifth embodiment.

In a case that the predetermined time has elapsed from the starting of the engine, it is judged that the engine operation is stabilized. The process proceeds step 514, the program of FIG. 20 is executed, the transient operation condition is generated forcedly. In this time period, the fuel property is detected by a method similar to the fourth embodiment.

Figure 21:
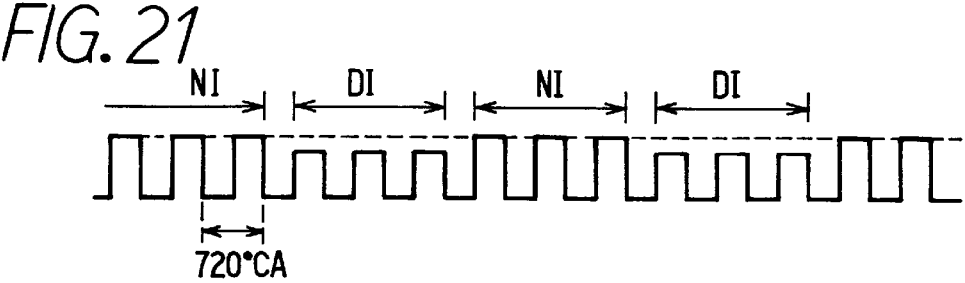
FIG. 21 is a time chart showing an injection pulse.

The program of FIG. 20 acts as the transient operating means recited in claims. The injection amount is varied as shown in FIG. 21. Here, tree injections make a group. A varied amount is a certain level which does not influence on the driveability. In the program, it is judged that whether the count value of a counter Cstep counting times of the injections is not more than two at step 521. In a case that it is not more than two, the process proceeds step 522, the injection amount correction coefficient Fc is corrected so that it is decreased. The coefficient Fc is a composite value of various correction coefficient according to the engine operating condition. For instance, the coefficient Fc is multiplied 0.95. therefore, the injection amount is decreased 95% of a normal injection amount when the count value of the counter Cstep takes from 0 to 2.

On the other hand, in a case that the count value of the counter Cstep takes not less than three, the injection amount correction coefficient Fc is not corrected, the normal injection amount is used.

After that, the process proceeds step 523, the counter Cstep is counted up. At step 524, it is judged that whether the count value of the counter Cstep reaches to six or not. In a case it reaches six, the process proceeds step 525, and the counter Cstep is cleared.

The above process is repeated. The transient operating condition is forcedly generated by changing alternately a normal injection NI and a decreased injection DI every three injections. The decreased injection can be replaced by an increased injection II. A cycle for changing the normal injection and the decreased injection (the increased injection) is not limited every three injections, it can be used that a every injections, every two injections or every four or more injections. It can be used that the transient operating condition is generated by changing the decreased injection DI and the increased injection II alternately. It can be used that go the transient operating condition is generated by changing a throttle opening degree (the introduced air amount) on a vehicle having a electric throttle system.

In the above described fifth embodiment, the temporary transient operating condition is forcedly generated while the first operation after the refueling. It is possible to detect the fuel property, and to detect the fuel property at every refueling certainly.

(sixth embodiment)

It is preferable to prohibit the detection of the fuel property during the idle operation as shown in the fourth embodiment. However, in a case that it is left in the idle operation after the starting, warm-up is progressed to increase a temperature in the fuel transport system. Therefore, there is a possibility to be not able to detect the fuel property accurately, even the fuel property detection is executed.

Figure 22:
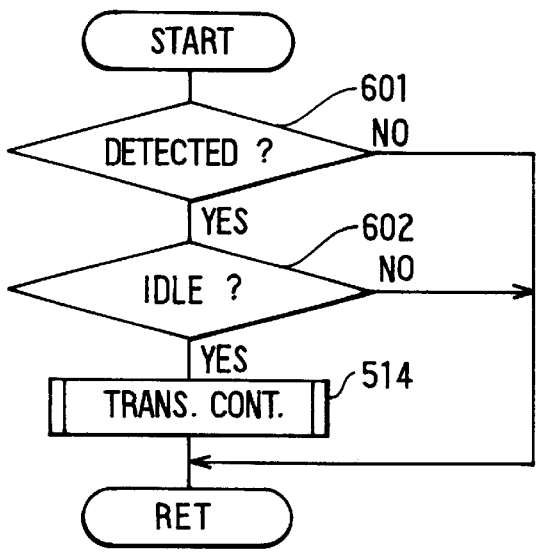
FIG. 22 is a flowchart showing a program of a sixth embodiment.

In the sixth embodiment, the fuel property is detected by generating the temporary transient operating condition when the idle operation is detected by the program of FIG. 22.

In the program of FIG. 22, at step 601, it is judged that whether the fuel property is detected or not. In a case that the fuel property is detected, the program is finished.

On the other hand, the fuel property is not detected, the process proceeds step 602, it is judged that whether it is in the idle operation or not. For instance, the idle operation is detected if at an idle switch (not shown) is turned on and the engine rotational speed is not more than a predetermined rotational speed. If the idle operation is not detected, the program is finished.

If the idle operation is detected, the process proceeds step 514, the program of FIG. 20 is executed. The transient a operating condition is forcedly generated while the idle operation. The fuel property is detected by a method similar to the fourth embodiment. As a result, it is possible to detect the fuel property accurately while the idle operation even in a case that it is left in the idle operation after the starting.

(seventh embodiment)

In the fourth embodiment the injection amount is taken as the input information of the fuel transport system model as shown in FIG. 10. However, air-fuel ratio of the mixture supplied for the engine 410 (hereafter referred as a supply air-fuel ratio) varies according to the increasing and decreasing of the injected amount. Accordingly, it may be intended to construct a model which takes the supply air-fuel ratio as the input information instead of the injection amount.

Accordingly, in the seventh embodiment shown in FIGS. 23 to 26, it is used that the fuel and air transport system model modeling the behavior of the mixture until it introduced into the cylinders of the engine 410. The supply air-fuel ratio (SP $\lambda^{-1}$) is taken as the input information and the exhaust gas air-fuel ratio (Ex$\lambda^{-1}$) is taken as the output information of the fuel and air transport system model. Here, $1/\lambda=\lambda^{-1}$ means the fuel excess rate which is a reciprocal of the air excess rate $\lambda$. In the seventh embodiment, the sensor model, modeling the flow delay and the detection delay, is used similar to the fourth embodiment.

The system identification model of the seventh embodiment uses the delay corrected SP$\lambda^{-1}$ by the sensor model and the detected SE$\lambda^{-1}$ by the air-fuel ratio sensor 429. The fuel property parameter is calculated by a method similar to the fourth embodiment. Additionally, in the seventh embodiment, SP$\lambda^{-1}$ and SE$\lambda^{-1}$ are used for the data on the model after the band pass filter process and the averaging process respectively. Here, the band pass filter (B.P.F.) removes the low frequency disturbance (the drift, the offset and the trend) and the high frequency disturbance (noise). The averaging process calculates an average value during a predetermined crank angle (for instance 720° CA). The dispersion between the cylinders and dispersion between the sensors are suppressed by the averaging process.

Further, the system identification model of the seventh embodiment has a function to learn and renew the time constant of the sensor model after completion of warm-up. That is, the detection delay is generated based on both the difference of the fuel property and the time constant of the sensor model before completion of warm-up (in warm-up). However, the temperature of the inner wall of the intake port is high after completion of warm-up. The adhering amount of the injected fuel on the inner wall is decreased. The generating amount of wet and the evaporating amount of wet are balanced. Then, it is possible to learn the time constant of the sensor model, because only the time constant of the sensor model is the cause of the detection delay after completion of warm-up.

Hereafter, the process of each programs (1) to (3) of FIGS. 24 to 26 will be described.

Figure 24:
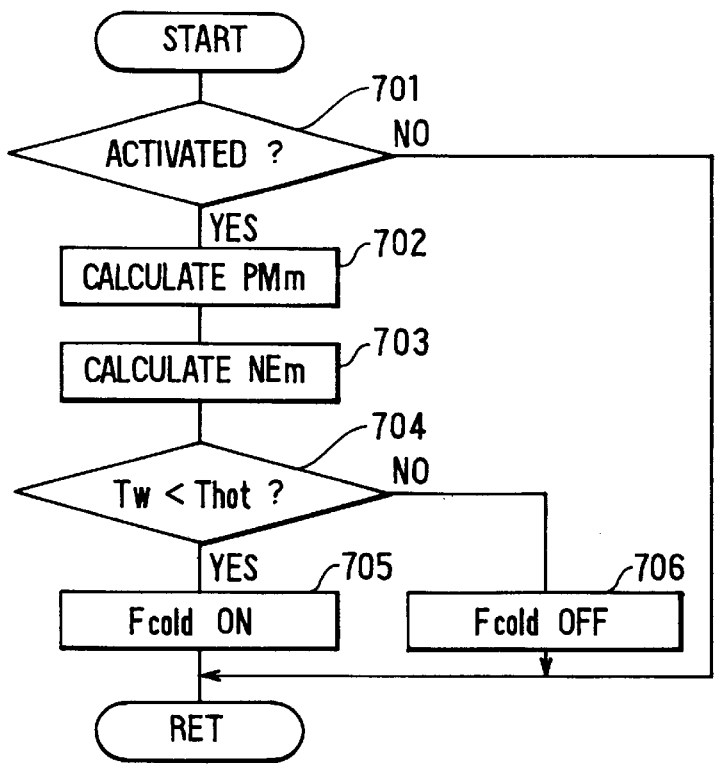
FIG. 24 is a flowchart showing a first program of the seventh embodiment.

The program (1) of FIG. 24 runs every predetermined crank angle (720° CA/number of cylinders). The program (1) runs, at step 701, it is judged that whether the air-fuel ratio sensor is activated or not. In a case that it is not activated, the program (1)is finished, because air-fuel ratio of exhaust gas can't detect accurately.

After that, the air-fuel ratio sensor is activated, the process proceeds step 702, the average intake pressure PMm in one cycle is calculated. At step 703, the average engine rotational speed NEm in one cycle is calculated. After that, the process proceeds step 704, it is judged that whether it is in warm-up or not by judging whether the water temperature Tw is not higher than the predetermined temperature Thot. If the water temperature is not higher than the predetermined temperature Thot, warm-up is detected, and a warm up flag Fcold is turned on (Step 705). If the water temperature is higher than the predetermined temperature Thot, completion of warm-up is detected, and the warm up flag Fcold is turned off (step 706).

Figure 25:
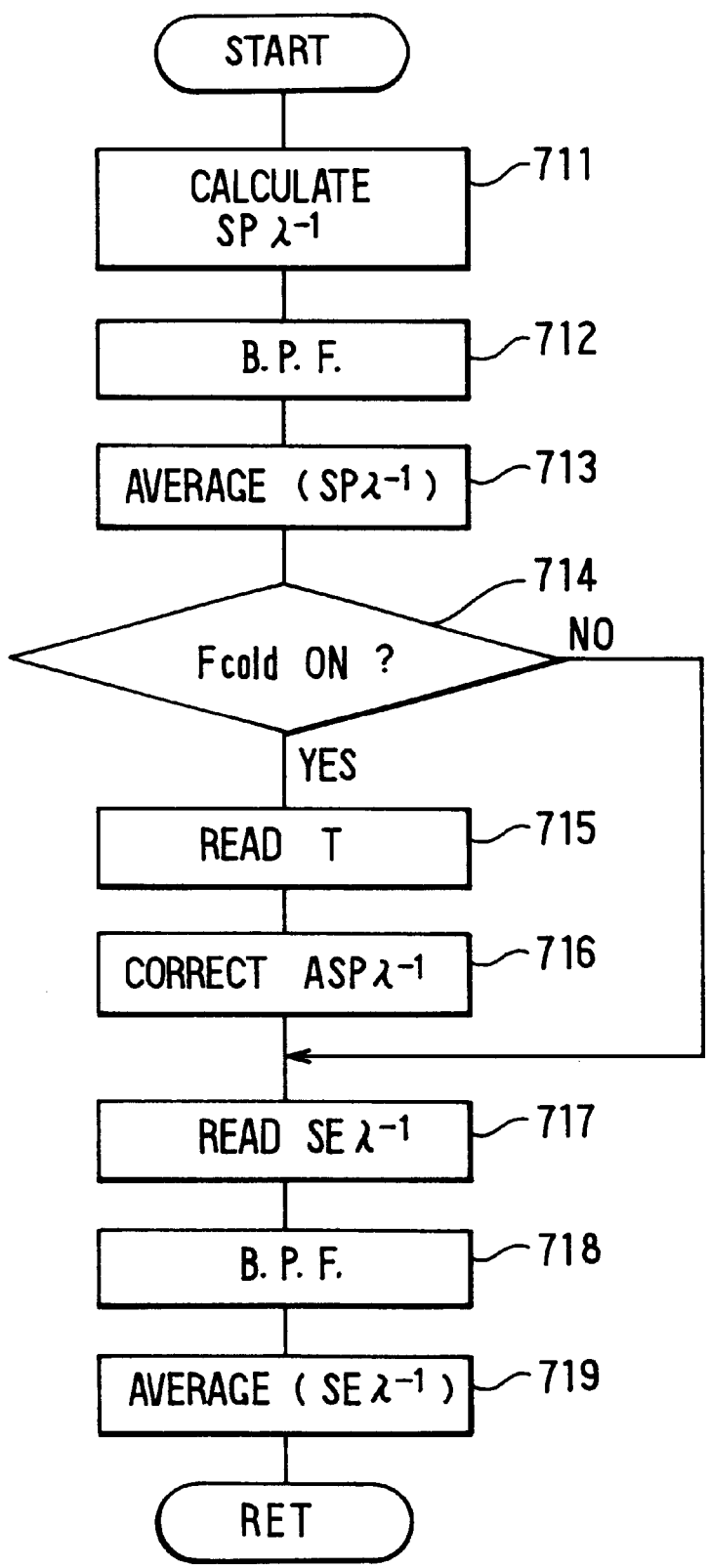
FIG. 25 is a flowchart showing a second program of the seventh embodiment.

On the other hand, for instance, the program (2) of FIG. 25 runs every one cycle (720° CA). The program (2) runs, at step 711, the $SP\lambda^{-1}$ is calculated by the following expression by using the intake air amount Q and the injected amount Finj:

$$SP\lambda^{-1}=Finj/(Q/14.6)$$

After that, at step 712, $SP\lambda^{-1}$ is processed the band pass filter by the following expression:

$$y(i)=a1 \cdot y(i-1)+a2 \cdot y(i-2)+\ldots+a10 \cdot y(i-10)+b1 \cdot u(i-1)+b2 \cdot u(i-2)+\ldots+b10 \cdot u(i-10)$$

Here, u represents input, y represents output, and subscripts (i), (i−1) and (i−2) represent the present value, the last value and the before last value . . . respectively. Further, ai and bi are filter designing parameters, and can be designed according to a data sampling interval and a passing frequency. The above expression is a band pass filter having 10th order, but the order number can be changed. The low frequency disturbance (the drift, the offset and the trend) and the high frequency disturbance (the noise) are removed by the band pass filter process.

After the band pass filter process, the process proceeds step 713, an average value ($ASP\lambda^{-1}$) is calculated. After that, at step 714, it is detected that whether the warm up flag Fcold is ON (in warm up) or not. If it is ON (in warm up), the process proceeds step 715, the learned value of the time constant T of the sensor model is read, the learned value is learned at step 723 of FIG. 26 which will be described later. After that, at step 716, the delay correction process applies to the ASP $\lambda^{-1}$ by using the time constant T of the sensor model to calculate a $CASP\lambda^{-1}$.

$$A(i)=T \times A(i-1)+(1-T) \times B(i-1)$$

Here, A represents $CASP\lambda^{-1}$, and B represents $ASP\lambda^{-1}$. The warm up flag Fcold is OFF (warm-up is completed), step 715 and 716 are processed for learning the time constant T of the sensor model which will be described later.

After that, the process proceeds step 717, the detected air-fuel ratio ($SE\lambda^{-1}$) is read. At next step 718, the band pass filter process applies to the $SE\lambda^{-1}$ to remove the low frequency disturbance (the drift, the offset and the trend) and the high frequency disturbance (the noise) by a method similar to the above-mentioned step 712. After that, at step 719, the average value ($ASE\lambda^{-1}$) is calculated, and the program is finished. The process of steps 712 and 718 acts as the filtering means in claims.

Figure 26:
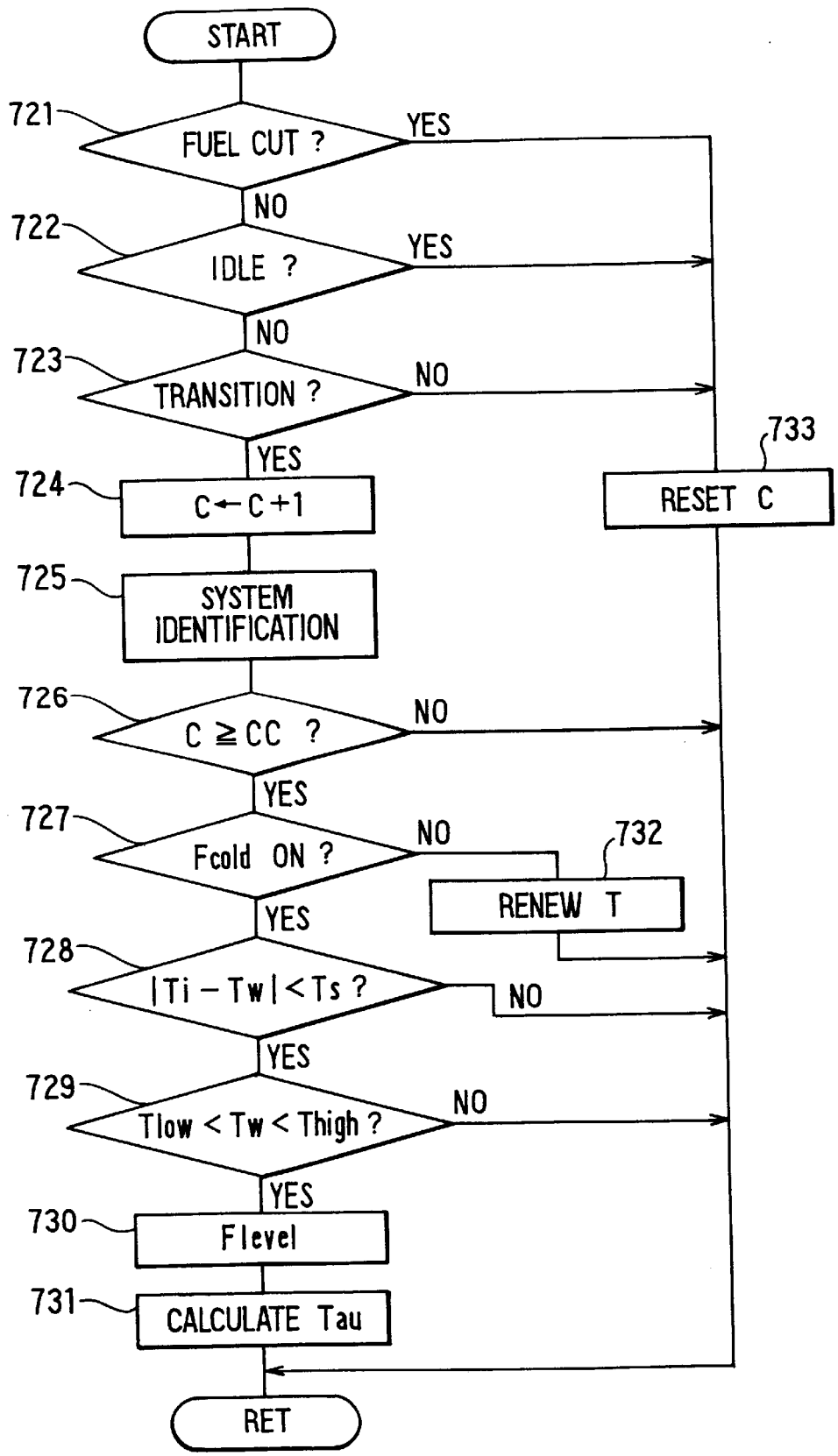
FIG. 26 is a flowchart showing a third program of the seventh embodiment.

On the other hand, a program (3) of FIG. 26 is executed, for instance every one cycle (720° CA). The program runs, first, at steps 721 to 723, it is detected that whether the requirements are established or not. The requirements are: (1) it is not in fuel-cut (step 721); (2) it is not in the idle operation (step 722) and (3)it is in the transient operation condition (step 723). In a case the requirements are not established, the process proceeds step 733, the process resets a counter C which will be described later, and the program (3) is finished.

After that, at the time the requirements are established, the process proceeds step 724, and the counter C is counted up. Then, the process proceeds step 725, the fuel property parameter is calculated based on the system identification model by using the $CASP\lambda^{-1}$ calculated at step 716 and the $ASE \lambda^{-1}$ at step 719. The method of the system identification model is the same as the fourth embodiment.

After the fuel property is calculated, the process proceeds step 726, it is detected that whether the count value of the counter C reaches a predetermined value CC or not.

If the count value of the counter C does not reach to the predetermined value, the program (3) is finished. That is, it is necessary to elapse a time, for instance about ten seconds, until the fuel property parameter is stabilized from three requirements (1) to (3) for execution of the fuel property parameter calculation are established. Then, the detection of the fuel property is executed after a stabilization of the fuel property.

After that, at a time the count value of the counter C reaches the predetermined value CC, the process proceeds step 727, it is detected that whether the warm up flag Fcold is ON (in warm up) or not. If it is ON, the process proceeds step 728, it is detected that whether it is the restart or not by judging whether an absolute value of difference between the intake air temperature Ti and the water temperature Tw is lower than the restart judging value Ts or not. When it is restart, the fuel property can't detect accurately. Then, if restart is detected at step 728, the program (3) is finished.

On the other hand, if it is not restart, the process proceeds step 729, it is detected that the water temperature Tw is in the predetermined range (Tlow<Tw<Thigh) or not. If the Tw is out of the range, the program (3) is finished. If the water temperature is in the range, the process proceeds step 730, the fuel property Flevel is detected by the map or the like based on the fuel property parameter and the water temperature by using a method similar to the fourth embodiment. After that, at step 731, the injection amount Tau is corrected according to the fuel property by using a method similar to the fourth embodiment.

In contrast, in a case that it is detected the warm up flag Fcold is OFF (warmup is completed) at step 727, the process proceeds step 732, and the time constant T of the sensor model is learned and renewed. The process of step 727 acts the learning means recited in claims.

As described above, the detection delay is generated according to both of the difference of the fuel property and the time constant T of the sensor model. Therefore, at step 716 of FIG. 25, the delay correction is applies to the ASP $\lambda^{-1}$ by using the time constant T of the sensor model to calculate the $CASP\lambda^{-1}$. It is designed to evaluate only the detection delay based on the difference of the fuel property in the system identification model by being taken the $CASP\lambda^{-1}$ as the input. In contrast, after warm-up is completed, the generating amount of wet and the evaporating amount of wet are balanced, because temperature of the inner wall of the intake port is high. Then, the delay based on the difference of the fuel property almost disappears. Therefore, after warm-up is completed, the average supply 1/λ, keeping its original condition, is taken as the input information, without the delay correction by the time constant T of the sensor model. Then, it is possible to evaluate the detection delay based on the time constant T of the sensor model by the system identification, and to learn the time constant T of the sensor model. It is possible to improve the detecting accuracy of the fuel property by canceling the error generated by the individual system difference and the deterioration with age, because the time constant T of the sensor model is learned and renewed. Further, this seventh embodiment provides the advantages similar to the fourth embodiment.

Further, in the fourth and seventh embodiments, the fuel property is not detected during the idle operation. However, it can be used that the fuel property is detected when the shift lever of the automatic transmission is operated, the air conditioner switch is turned on or the like during the idle operation, because the transient operating condition is temporarily provided.

Further, in the fourth and seventh embodiment, the band pass filter process of steps 712 and 718 of FIG. 25 removes the low frequency disturbance and the high frequency disturbance included in the SPA$\lambda^{-1}$ and the SE$\lambda^{31\ 1}$. However, the influence of the high frequency disturbance can be suppressed by an averaging process or the like, because the high frequency disturbance is a temporary and momentary disturbance. The low frequency disturbance continues long and can't be removed by the averaging process or the like. Therefore, it can be used that the low frequency disturbance is only removed by a low cut filter process. In a case that the filter process is executed, the averaging process (steps 713 and 719) can be eliminated. The filter process can be added on the program of the fourth embodiment.

Further, in the seventh embodiment, the 1/$\lambda$ (fuel excess rate) is used as the data of air-fuel ratio, but the air excess rates can be used, of course, the weight ratio (A/F) between the air amount A and the fuel amount F can be used.

Further, for instance, the following system can be used. In a case that the fuel property is detected while the idle operation, it is used that the system identification model in which the SP$\lambda^{-1}$ is taken as the input information. In running operation, it is used that the system identification model in which the injection amount is taken as the input information. Then, the system identification models are changed.

Further, the fuel property can be detected by using both of methods which are used in any one of the first, the second and the third embodiments and any one of the fourth, the fifth, the sixth and the seventh embodiments.

Although the present invention has been fully described in connection with preferred embodiments thereof with reference to the accompanying drawings, it is to be noted that various changes and modifications will become apparent to those skilled in the art. Such changes and modifications are to be understood as being within the scope of the present invention as defined by the appended claims.

What is claimed is:

1. A fuel property detecting apparatus for detecting a property of fuel supplied to an internal combustion engine, said apparatus comprising:

injection amount parameter calculating means for calculating an injection amount parameter which is an injection amount of fuel injected form a fuel injection valve or which has a correlation with said injection amount;

combustion amount parameter calculating means for calculating a combustion amount parameter which is a combustion amount of fuel burned in a cylinder or which has a correlation with said combustion amount;

fuel property detecting means for detecting a fuel property based on a relationship between said injection amount parameter calculated by said injection amount parameter calculating means and said combustion amount parameter calculated by said combustion amount parameter calculating means;

restart judging means for judging whether said internal combustion engine is started under a warm-up condition; and fuel property detection prohibiting means for prohibiting said detection of the fuel property by said fuel property detecting means when a hot-restart is judged by said restart judging means.

2. A fuel property detecting apparatus for detecting a property of fuel supplied to an internal combustion engine, comprising:

supply air-fuel ratio calculating means for calculating a supply air-fuel ratio of mixture supplied to said internal combustion engine;

air-fuel ratio sensor for detecting an air-fuel ratio of exhaust gas from said internal combustion engine;

parameter calculating means for calculating an evaporating time constant of fuel or a physical amount depending on it as a fuel property parameter based on said supply air-fuel ratio and an output of said air-fuel ratio sensor, by using a fuel and air transport system model modeling a behavior of mixture until mixture of injected fuel from said fuel injection valve and introduced air is introduced into a cylinder of said internal combustion engine, by taking said supply air-fuel ratio as an input information of said fuel and air transport system model, by taking said air-fuel ratio of exhaust gas as an output information, and by considering a delay until said air-fuel ratio is detected by said air-fuel ratio sensor; and fuel property detecting means for detecting a fuel property based on a fuel property parameter calculated by said parameter calculating means.

3. A fuel property detecting apparatus for the internal combustion engine according to claim 2, further comprising:

filter means for removing a low frequency disturbance included in said supply air-fuel ratio and an output of said air-fuel ratio sensor which are used for calculating said fuel property parameter.

4. A fuel property detecting apparatus for the internal combustion engine according to claim 2, wherein:

said parameter calculating means synchronize phases of said input and output information of said fuel and air transport system model by applying a delay correction to said supply air-fuel ratio, by using a sensor model modeling a delay until said air-fuel ratio is detected by said air-fuel ratio sensor.

5. A fuel property detecting apparatus for the internal combustion engine according to claim 4, further comprising:

learning means for learning a time constant of said sensor model after completion of warm-up of said internal combustion engine.

* * * * *